(12) United States Patent
Geijer Lundin et al.

(10) Patent No.: US 9,648,624 B2
(45) Date of Patent: May 9, 2017

(54) SEMI-DECENTRALIZED SCHEDULING IN A WIRELESS NETWORK

(71) Applicants: Telefonaktiebolaget L M Erisccon (publ), Stockholm (SE); Leif Lundin, Stockholm (SE)

(72) Inventors: Erik Geijer Lundin, Stockholm (SE); Graham C Goodwin, Newcastle (AU); Katrina Lau, Wallsend (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 176 days.

(21) Appl. No.: 14/415,622

(22) PCT Filed: Jul. 16, 2013

(86) PCT No.: PCT/SE2013/050910
§ 371 (c)(1),
(2) Date: Jan. 19, 2015

(87) PCT Pub. No.: WO2014/014404
PCT Pub. Date: Jan. 23, 2014

(65) Prior Publication Data
US 2015/0223251 A1 Aug. 6, 2015

Related U.S. Application Data

(60) Provisional application No. 61/673,813, filed on Jul. 20, 2012.

(51) Int. Cl.
*H04W 4/00* (2009.01)
*H04B 7/216* (2006.01)
(Continued)

(52) U.S. Cl.
CPC ..... *H04W 72/0486* (2013.01); *H04W 72/082* (2013.01); *H04W 72/1252* (2013.01);
(Continued)

(58) Field of Classification Search
CPC ........... H04W 72/0486; H04W 72/082; H04W 72/1252; H04W 16/08; H04W 84/045; H04W 28/16
See application file for complete search history.

(56) References Cited

U.S. PATENT DOCUMENTS

2004/0252666 A1* 12/2004 Johnson ............... H04B 7/2628
370/335
2011/0151886 A1 6/2011 Grayson et al.

FOREIGN PATENT DOCUMENTS

EP 1292162 A1 3/2003
EP 1294208 A1 3/2003
(Continued)

OTHER PUBLICATIONS

Lundin, "Interference Power Based Uplink Admission Control in Enhanced WCDMA", IEEE 66th Vehicular Technology Conference, Sep. 30-Oct. 3, 2007, 1-5.
(Continued)

*Primary Examiner* — Kiet Tang
(74) *Attorney, Agent, or Firm* — Patent Portfolio Builders, PLLC

(57) ABSTRACT

In a network (700, 800) with a plurality of cells (715, 815, 825), there may be interference couplings among the cells (715, 815, 825). This may be particularly true for heterogeneous networks (800). For radio resource scheduling in such network (700, 800), a semi-decentralized scheduling is proposed in which radio resource scheduling issue is reformulated as load scheduling issue. In the proposed semi-decentralized scheduling, portions of the total load or available headroom are centrally allocated to each local node (710, 810, 820) subject to the stability of the network (700, 800). At each local node (710, 810, 820), radio resources are granted to users (740, 840) of that local node (710, 810, 820)
(Continued)

subject to the portion of the load or headroom allocated to that local node (710, 810, 820).

27 Claims, 11 Drawing Sheets

(51) Int. Cl.
*H04W 72/04* (2009.01)
*H04W 72/12* (2009.01)
*H04W 72/08* (2009.01)
*H04W 28/16* (2009.01)
*H04W 84/04* (2009.01)
*H04W 16/08* (2009.01)

(52) U.S. Cl.
CPC ............ *H04W 16/08* (2013.01); *H04W 28/16* (2013.01); *H04W 84/045* (2013.01)

(56) References Cited

FOREIGN PATENT DOCUMENTS

| WO | 2008057016 A1 | 5/2008 |
|---|---|---|
| WO | 2008097181 A2 | 8/2008 |
| WO | 2011023217 A1 | 3/2011 |
| WO | 2011049495 A1 | 4/2011 |

OTHER PUBLICATIONS

Lundin, et al., "Semi-Decentralized Scheduling of Users in Heterogeneous WCDMA Telecommunications Networks", IEEE 6th International Conference on Signal Processing and Communication Systems, Dec. 12-14, 2012, 1-6.

Office action in EP application No. 13819246.3 mailed Mar. 3, 2016.

Office action in EP application No. 13819246.3 mailed Jul. 22, 2015.

\* cited by examiner

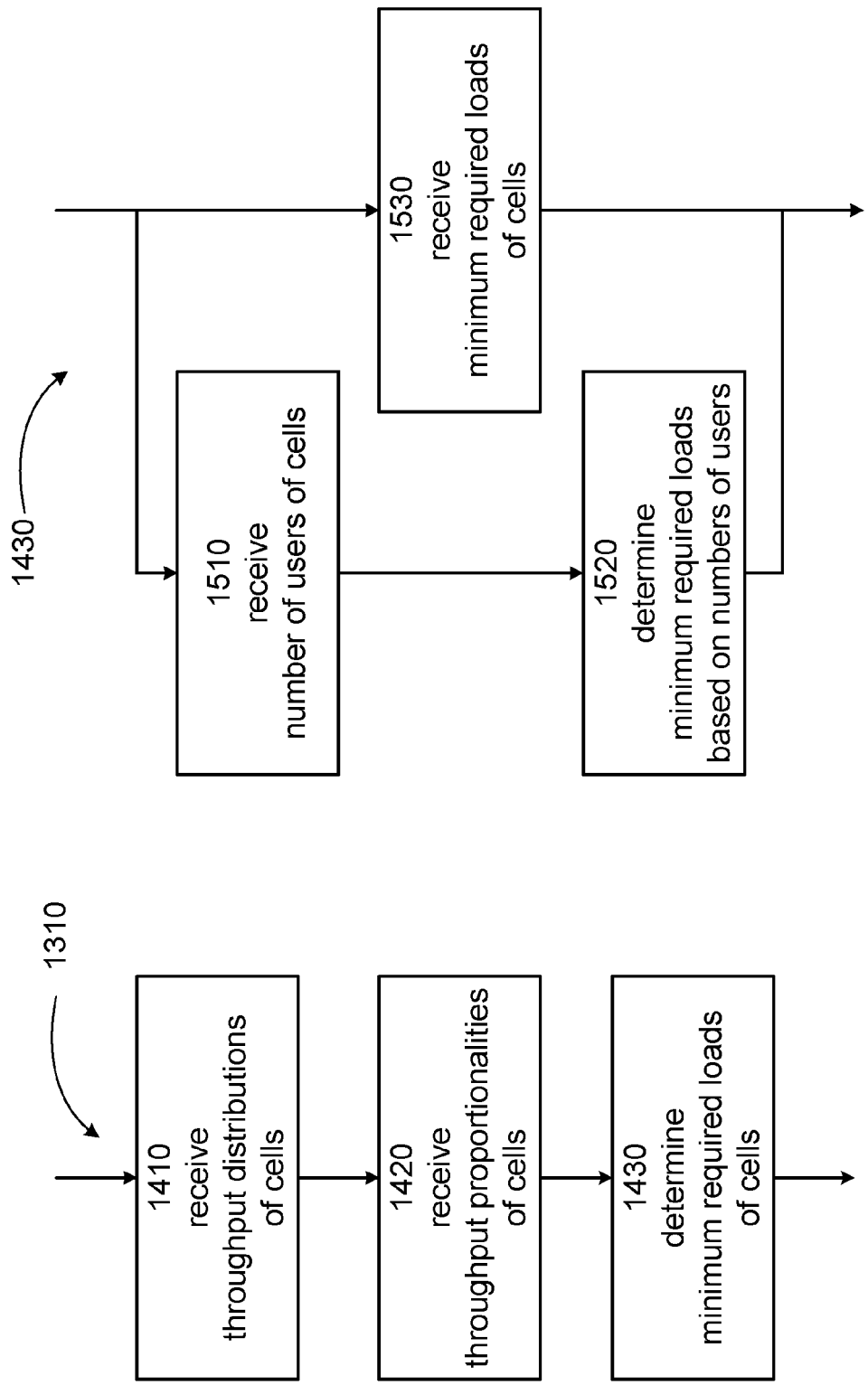

SEMI-DECENTRALIZED SCHEDULING IN A WIRELESS NETWORK

RELATED APPLICATION

This application claims priority to U.S. Provisional Application 61/673,813 entitled "SEMI-DECENTRALIZED SCHEDULING IN A HETEROGENEOUS NETWORK" filed Jul. 20, 2012, the contents of which is hereby incorporated by reference.

TECHNICAL FIELD

The technical field of the present disclosure generally relates to communications in a wireless network. In particular, the technical field relates to apparatus(es), method(s), and/or system(s) for scheduling of radio resources for communications for users in a wireless network.

BACKGROUND

Recently, mobile broadband traffic has been exploding in wireless networks such as WCDMA (wideband code division multiple access). One consequence is a corresponding steep increase in interferences in these networks, or equivalently, a steep increase in load. This makes it important to exploit the load headroom that is left in the most efficient way.

Also, wireless networks are becoming more heterogeneous, with macro BSs (base station) being supported by low power BSs at traffic hot spots. Furthermore, home base stations are emerging in many networks. This trend puts increasing demands on inter-cell interference management.

In heterogeneous networks (HetNets), different kinds of cells are mixed. In a HetNet architecture, multiple low power cells can be embedded within a larger macro cell such as illustrated in FIG. 1. As seen, in the HetNet 100, a macro base station 110, which is a type of a radio node, is deployed and serves a corresponding macro cell 115. But in addition, several small (also referred to as "pico") base stations 120, also a type of radio node, are deployed and serve corresponding small or pico cells 125. The transmission powers of these pico nodes 120 are relatively small compared to that of the macro node 110 (e.g., 2W vs. 40W).

HetNets can be divided into two deployment categories—co-channel and combined cell. In the co-channel deployment, the pico nodes have cell identifiers different from that of the macro node. That is, the pico nodes create pico cells with different ids from the overlapping macro cell. FIG. 1 illustrates a co-channel deployment example. As seen, the co-channel deployment 100 is such that the macro node 110 creates the macro cell 115 will cell ID "A". The pico nodes 120-1, 120-2 and 120-3 create corresponding cells 125-1, 125-2 and 125-3 with cell IDs "B", "C" and "D". Note that the macro cell 115 overlaps each of the pico cells 125-1, 125-2 and 125-3.

But in the combined cell deployment, the pico node has a cell identifier same as that of the macro node. This is illustrated in FIG. 2. In the combined cell HetNet deployment 200, all radio nodes—the macro node 210 and the three pico nodes 220 all transmit the same cell ID "A". Again, the macro cell 315 overlaps the pico cells 225.

A problem that arises in Hetnets in that the cells—macro and pico—are likely to have different radio properties in terms of radio sensitivity, frequency band, coverage, output power, capacity, and acceptable load level among others. An important factor in HetNets is that of the air interface load management, i.e., the issues associated with the scheduling of radio resources in different cells and the interaction between cells in terms of inter-cell interference.

SUMMARY

A non-limiting aspect of the disclosed subject matter is directed to a method performed in a central scheduler to schedule the radio resources to users located in a plurality of cells of a wireless network. Each cell in the network may partially or wholly overlap with at least one other cell and/or geographically adjacent to at least one other cell. In one step of the method, the central scheduler may obtain, for each cell of the plurality of cells, load related parameters of that cell. For each cell in the network, the load related parameters of that cell may comprise a throughput distribution, a throughput proportionality, and one or both of a minimum required load and a number of users. In another step, the central scheduler may obtain, for each cell pair among the plurality of cells, a coupling factor of that cell pair. Each cell pair may comprise a cell x and a cell y of the network. The corresponding coupling factor may couple an interference experienced at the cell x due to usage of the radio resources scheduled for the users of the cell y. In yet another step, the central scheduler may allocate, for each cell, a free headroom to that cell based on the load related parameters of the cells and based on the coupling factors among the cells. For each cell, the corresponding free headroom may define an amount of load headroom available for distribution among the users of that cell when a local scheduler associated with that cell schedules the radio resources to those users. The central scheduler may allocate the free headrooms subject to a stability of the wireless network. The system stability may be defined such that when the radio resources are scheduled to the users in accordance with the allocated headrooms, then for each cell, an interference experienced at that cell due to usage of the scheduled radio resources does not exceed a maximum allowable interference at that cell. In a further step, the load manager may notify the local scheduler associated with each cell of the free headroom allocated to that cell.

Another non-limiting aspect of the disclosed subject matter is directed to a computer-readable medium which carries or stores therein programming instructions. When a computer executes the programming instructions, the computer executes the method performed in a central scheduler to schedule radio resources to users located in a plurality of cells of a wireless network as described above.

Another non-limiting aspect of the disclosed subject matter is directed to a central scheduler structured to schedule radio resources to users located in a plurality of cells of a wireless network. The central scheduler may comprise a parameters manager, a couplings manager, and a load manager. The parameters manager may be structured to obtain, for each cell of the wireless network, load related parameters of that cell. The couplings manager may be structured to obtain, for each cell pair among the plurality of cells, a coupling factor of that cell pair. The load manager may be structured to allocate, for each cell, a free headroom to that cell based on the load related parameters of the cells and based on the coupling factors among the cells. The load manager may also be structured to notify the local scheduler associated with each cell of the free headroom allocated to that cell.

Another non-limiting aspect of the disclosed subject matter is directed to a method performed in a local scheduler to schedule radio resources to users located in a cell of a wireless network, the cell being associated with the local scheduler. The associated cell may partially or wholly overlap with at least one other cell and/or geographically adjacent to at least one other cell. In one step of the method, the local scheduler may provide load related parameters of the associated cell to a central scheduler of the network. The load related parameters may comprise a throughput distribution, a throughput proportionality, and one or both of a minimum required load and a number of users of the associated cell. In another step, the local scheduler receive a notification from the central scheduler of a free headroom allocated to the associated cell. The allocated free headroom may define an amount of load headroom available for distribution among the users of the associated cell when the local scheduler schedules the radio resources to those users. In a further step, local scheduler may schedule the radio resources to one or more users located in the associated cell subject to the allocated free headroom. When the radio resources are scheduled to the users in accordance with the allocated free headroom, then an interference experienced at the associated cell due to usage of the scheduled radio resources does not exceed a maximum allowable interference at the associated cell.

Another non-limiting aspect of the disclosed subject matter is directed to a computer-readable medium which carries or stores therein programming instructions. When a computer executes the programming instructions, the computer executes the method performed in a local scheduler to schedule radio resources to users located in a cell of a wireless network associated with the local scheduler as described above.

Another non-limiting aspect of the disclosed subject matter is directed to a local scheduler structured to schedule radio resources to users located in a cell of a wireless network associated with the local scheduler. The local scheduler may comprise a parameters manager and a resource manager. The parameters manager may be structured to provide load related parameters of the associated cell to a central scheduler of the wireless network. The resource manager may be structured to receive from the central scheduler a notification of a free headroom allocated to the associated cell, and to schedule the radio resources to one or more users located in the associated cell subject to the free headroom allocated to the cell by the central scheduler.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 14 illustrates a flow chart of an example process performed by a central scheduler to obtain load related parameters of cells;

FIG. 15 illustrates a flow chart of an example process performed by a central scheduler to determine minimum required loads of cells;

DETAILED DESCRIPTION

Figure 1:
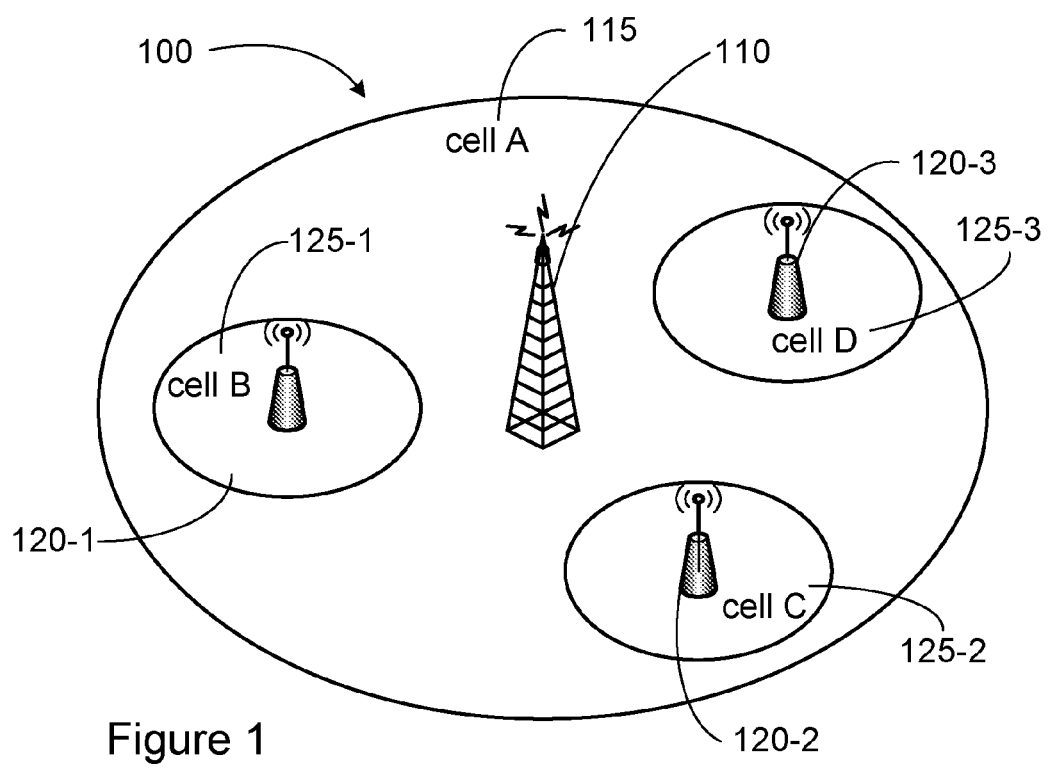
FIG. 1 illustrates an example of a co-channel heterogeneous network deployment.
Figure 2:
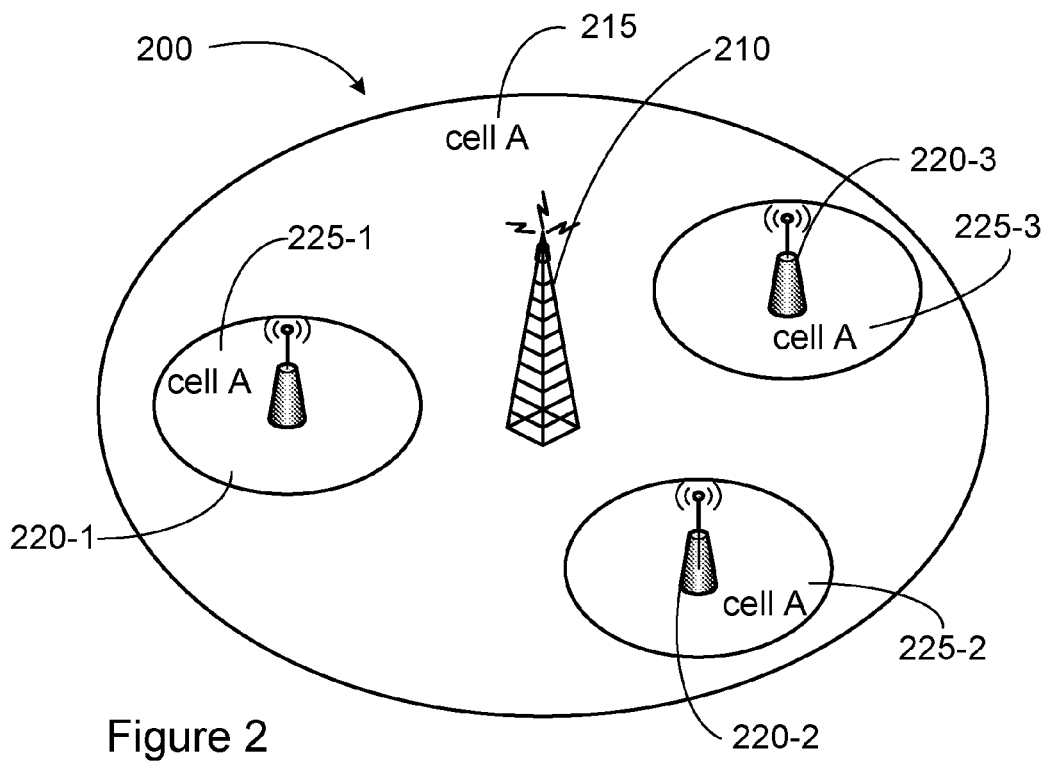
FIG. 2 illustrates an example of a combined cell heterogeneous network deployment.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "schedulers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "scheduler" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, LTE—are used as examples for explanation purposes. Note that the technology described herein can be applied to non-3GPP standards, e.g., WiNAX, cdma2000, 1×EVDO, etc. Thus, the scope of this disclosure is not limited to the set of 3GPP wireless network systems and can encompass many domains of wireless network systems. Also, a base station (e.g., RBS, NodeB, eNodeB, eNB, macro node, pico node, etc.) will be used as an example of a radio node in which the described method can be performed. However, it should be noted that the disclosed subject matter is applicable to any radio node, such as relay stations, that receive wireless signals. Also without loss of generality, mobile terminals (e.g., UE, mobile computer, PDA, smart phones, tables, etc.) will be used as examples of wireless terminals that communicate with the base station. The term "user" may be used interchangeably with "wireless terminal" to enable easier flow of reading.

It should be recognized that the term "cell" may be used to refer to different things depending on the context. For example, in one sense, the term "cell" may be used to refer to a coverage area (interchangeable with service area) corresponding to a geographical region of service covered by a radio node capable of providing wireless services. In another sense, the same term "cell" may be used to refer to the radio node itself. The context in which the term is used should make this clear.

As mentioned above, there is a current trend toward heterogeneous network (HetNet) architectures in which multiple pico cells are embedded within each larger macro cell. Pico cells are typically deployed to eliminate coverage holes in the homogeneous network using macro nodes only. From one perspective, this can be viewed as inserting localized pico cell(s) within a macro cell. Pico cells can be used in areas of user concentration such as shopping centers, airports, railway stations, and so on.

Note that the association between a coverage area and the radio node serving the coverage area may be logical. For example, a single physical radio node may be a multi-RAT (radio access technology) node capable of operating in at least first and second RATs to provide wireless services to users within first and second coverage area (respective service areas defined by communication reaches of the radio node over the first and second RATs). Even though the two coverage areas may overlap substantially or even completely, it may be preferred that the first and second coverage areas be differentiated from each other. Note that from the perspective of a user operating in the first RAT, the radio node operating in the second RAT may be viewed as a different radio node, and thus the second service area is a different service area. As another example, a single radio node may divide the geographical region into different sectors (e.g., use multiple antennas to serve three sectors of 120 degrees each, each with a different sector/cell ID). Here, the single radio node may be logically viewed as being three different radio nodes with each radio node serving a different coverage area.

In a HetNet architecture, because of the presence of localized antennas, users within pico cells produce less interferences to the macro cell than if they communicated directly with the macro cell. Pico cells can also reduce load on the macro cell. Generally, pico cells can offer flexible site acquisitions, and provide for increased bandwidth utilization efficiency. In short, significant gains can be achieved from the pico-macro division.

Nonetheless, some residual coupling may remain among the cells, which may impact the stability of the overall system. In the context of inter-cell interference, cells may be viewed as being coupled to each other since each cell—macro or pico—may act as a source of interference to every other cell. For explanation purposes, coupling as it relates to uplink scheduling—i.e., scheduling of resources for transmissions from users to base stations—will be described. However, it should be noted that some or all aspects described will be applicable in the downlink scheduling context as well.

Figure 3:
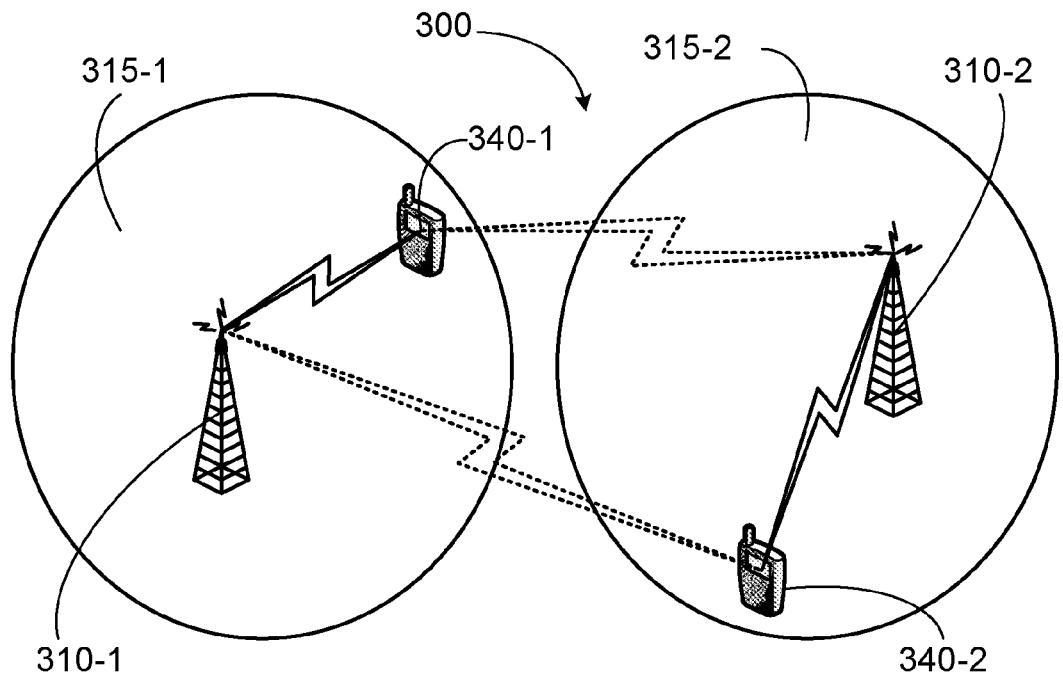
FIG. 3 illustrates an example scenario of interference coupling between two cells.

Consider a case of two cells such as illustrated in FIG. 3. In this figure, a relatively simple generic wireless network architecture 300 is illustrated in which a first radio node 310-1 provides wireless services to a first user 340-1 located within a corresponding first coverage area (or cell) 315-1. Similarly, a second radio node 310-2 is illustrated to provide wireless services to a second user 340-2 located within a corresponding second cell 315-2. In the uplink, the first user 340-1 wirelessly transmits signals to the first radio node 310-1, and the second user 340-2 wirelessly transmits signals to the second radio node 310-2. These desired communications are depicted with solid line comm-links.

However, the same transmissions from the first user 340-1 can reach into the second cell 315-2, and transmissions from the second user 340-2 can reach into the first cell 315-1. This implies that the first user 340-1 can be a source of interference in the second cell 315-2, and vice versa. In FIG. 3, such undesirable transmissions are depicted with dashed line comm-links.

Note that if the power transmitted by the first user first user 340-1 increases, then the interference seen by the second user 340-2 increases. The second user 340-2 then may increase its transmission power to maintain an adequate signal-to-interference ratio (SIR). This increases the interference seen by the first user 340-1 who then may need to increase its transmission power, and so on. This is sometimes referred to as the "cocktail party effect". The process may continue until a new equilibrium is reached between the first and second cells 315-1, 315-2. The equilibrium depends on the "strength" of the coupling—i.e., the coupling factor—between the two cells. If the load in one or both cells is too high, then the cells may continue to fight each other and the system can become unstable.

Figure 4:
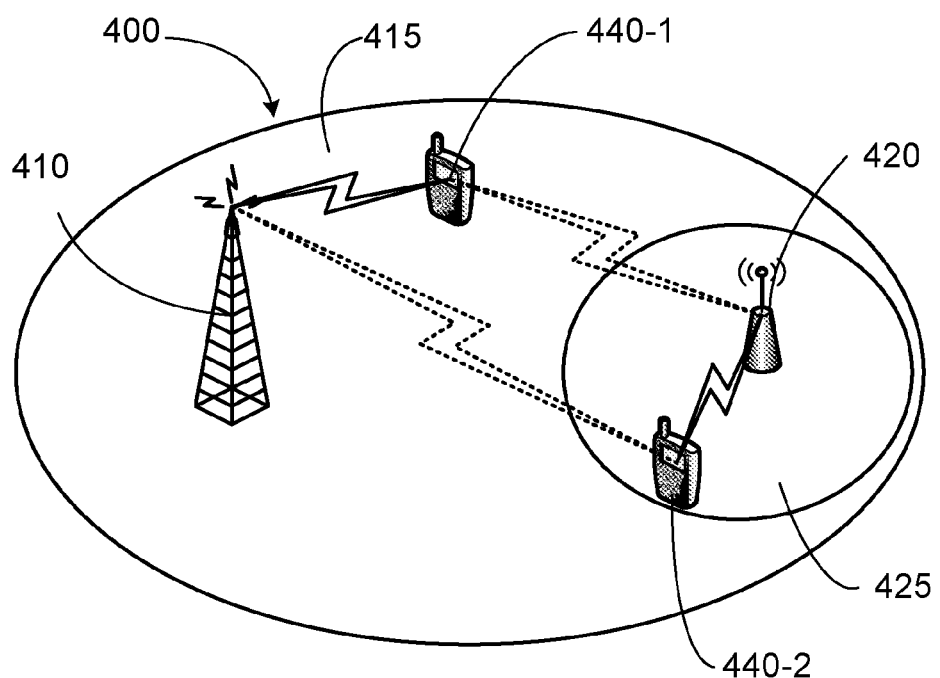
FIG. 4 illustrates another example scenario of interference coupling between cells in a HetNet setting.

FIG. 4 illustrates another example of interference coupling between two cells. In FIG. 4, a relatively simple HetNet architecture 400 (could be either co-channel or combined cell) is illustrated. The scenario in FIG. 4 may be viewed as being a particular example of the generalized scenario of FIG. 3. In FIG. 4, a macro node 410 is shown to provide wireless services within a corresponding macro coverage area (or cell) 415. First and second users 440-1, 440-2 are both located within the macro cell 415. The figure also shows a pico node 420 providing wireless services within a corresponding pico cell 425. In the figure, the first user 440-1 is not within any pico cell 425, while the second user 440-2 is shown as being within the pico cell 425. Thus, it may be assumed that the macro node 410 and the pico node 420 are serving the first and second users 440-1, 440-2, respectively.

Similar to the circumstance depicted in FIG. 3, there may be coupling of interferences between macro and pico cells 415, 425 due to the transmissions from the first user 440-1 reaching the unintended pico node 420, and the transmissions from the second user 440-2 reaching the unintended macro node 410. Again, the coupling factor represents the strength of coupling between the macro and pico nodes 410, 420.

In each of the FIGS. 3 and 4, only one user is shown to be located within each of the cells corresponding to the radio nodes of the cells. For example, in FIG. 3, the first radio node 310-1 (the second radio node 310-2) is shown to provide services only to the first user 340-1 (the second user 340-2). Likewise, in FIG. 4, the macro node 410 (the pico node 420) is shown to provide services only to the first user 440-1 (the second user 440-2). This is done to simplify the explanation of the interference coupling between two cells. It should be readily recognized that described coupling concept may be generalized to scenarios where there may be multiple users within one or both cells. Thus, between two cells, if the power transmitted by the users in one cell increases, then the interference seen by the other cell increases. The users in the other cell then increase their transmitted power, and so on until the equilibrium is reached or the system becomes unstable.

Figure 5:
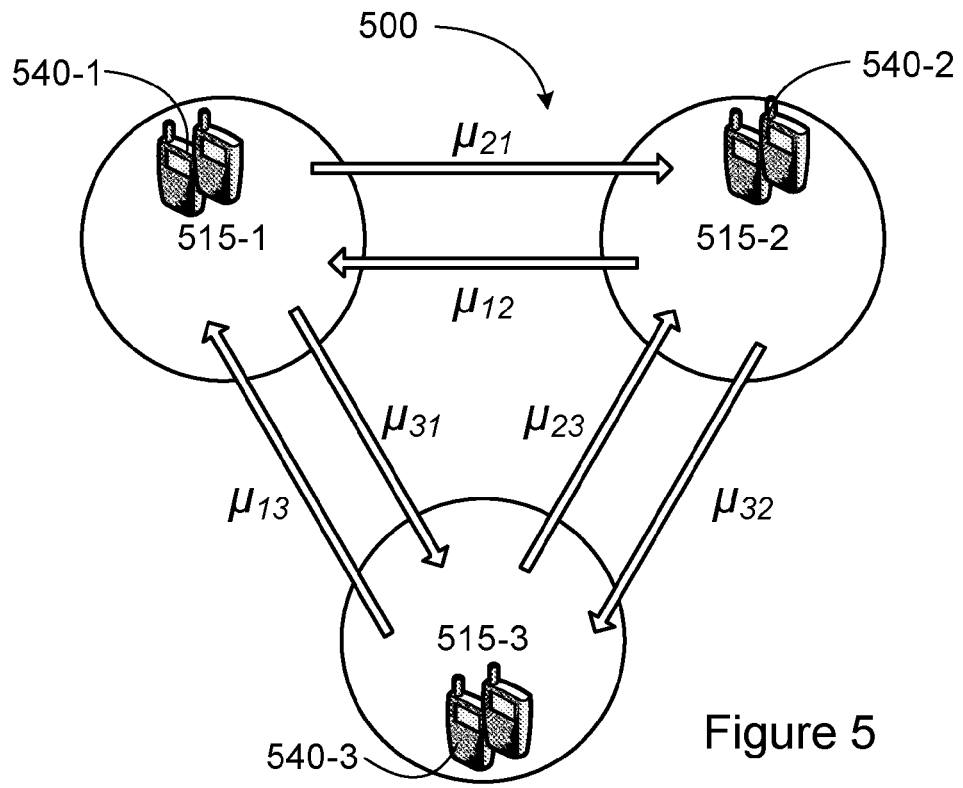
FIG. 5 illustrates another example scenario of interference coupling among any number of cells.

It should also be readily recognized that the interference coupling concept may be further generalized to cover circumstances in which there are any number cells. In FIG. 5, three cells 515-1, 515-2 and 515-3 are illustrated. Also, within each of the cells, there can be any number (zero or more) of users 540-1, 540-2 and 540-3. So as to minimize clutter, the radio nodes corresponding to the cells 515 are not illustrated.

As seen, the interference couplings that occur in system 500 as a whole may be described as interference couplings that occur between each combination of two cells. In this figure, three cells 515-1, 515-2 and 515-3 are shown. With three cells, three different combinations of two cells (515-1, 515-2), (515-2, 515-3) and (515-1, 515-3) are possible. Note that the interference may go both ways in each combination. For example, between cells 515-1 and 515-2, the first users 540-1 in the first cell 515-1 may be interfered with due to the transmissions from the second users 540-2 in the second cell 515-2. For example, in uplink transmissions, the radio node (e.g., eNB, NodeB, macro node, pico node, relay, etc.) corresponding to the first cell 515-1 may receive interfering transmissions from the second users 540-2. The coupling factor $u_{12}$ may represent the strength of this relationship. Likewise, the second users 540-2 may be interfered with due to the transmissions from the first users 540-1 of the first cell 515-1. This relationship may be represented by the coupling factor $u_{21}$.

Thus, it can be said that there is a directional aspect to the coupling factor $u_{xy}$. The direction may identify a victim of the interference (cell x) and a source of the interference (cell y), and the coupling factor $u_{xy}$ may represent a strength of that directional relationship. If the coupling factor $u_{xy}$ is relatively small, then for there to be a significant interference impact in cell x, it may take a relatively large transmission power from the users in cell y. On the other hand, if the coupling factor $u_{xy}$ is relatively large, then it may only take a relatively small transmission power from the cell y users to make a significant impact. For ease of reference, the term "cell pair" will be used between cells x and y to indicate this coupling relationship. In FIG. 5, there are six such cell pairs and corresponding coupling factors $u_{12}$, $u_{21}$, $u_{2}$, $u_{32}$, $u_{31}$, and $u_{13}$.

It should be noted that the coupling factors of complementary cell pairs may or may not be symmetrical. For example, between cells 515-1 and 515-2, the coupling factors $u_{12}$ and $u_{21}$ may be the same or different. Similarly, the coupling factors $u_{23}$ and $u_{32}$ may be the same or different, and the coupling factors $u_{31}$ and $u_{13}$ may be the same or different.

Also, in an aspect, the transmission power of a cell may be cumulative. For example, regarding the first cell 515-1, a transmission power of each first user 540-1 (or at least a portion thereof) can be viewed to contribute to a sum of transmission powers, and the cumulative sum may be taken to be the transmission power of the first cell 515-1. This is consistent with the common knowledge there is a positive correlation between the amount of interference in a system and the number of users in the system. This is also consistent with the common knowledge that there is also a positive correlation between transmission powers of individual users and the amount of interference in the system.

Figure 6:
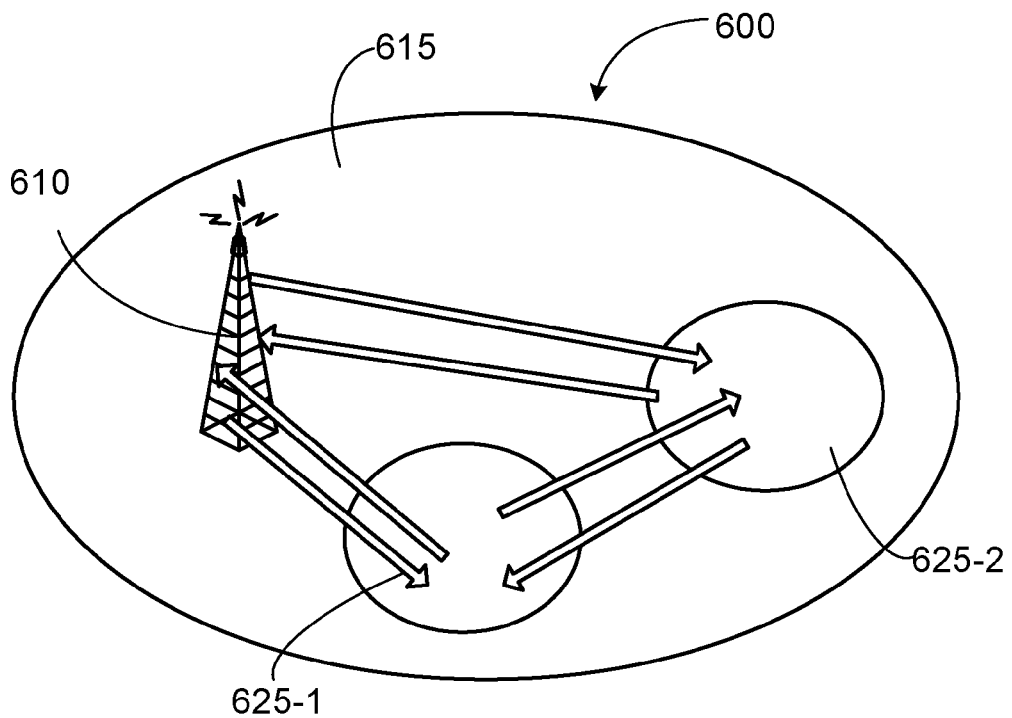
FIG. 6 illustrates another example scenario of interference coupling among any number of cells in a HetNet setting.

FIG. 6 illustrates another example of interference coupling among any number of cells in a HetNet setting, and may be viewed as representing a particular example of the situation illustrated in FIG. 5. In the HetNet system 600 of FIG. 6 (can be either co-channel or combined cell), a macro node 610 and corresponding macro cell 615 as well as two pico cells 625-1, 625-2 are shown. Also, coupling factors for each cell pair are illustrated as arrows. So as to minimize clutter, the coupling factors are not labeled and the pico nodes and users are not illustrated. In this particular instance, the transmissions from the macro cell 615 (i.e., transmissions from users connected to the macro node 610) may interfere with both pico cells 625-1, 625-2 and vice versa. Also, the two pico cells 625-1, 625-2 may interfere with each other. It should be readily apparent that the interference couplings among the cells as described above with respect to FIG. 5 are applicable to the scenario of FIG. 6.

When providing services to users, it is desirable to ensure that the system as a whole is stable. Normally, each cell in a system is able to tolerate a certain amount of interference (or undesired signals in general) and still maintain an acceptable level of performance (e.g., throughput). The tolerance level for each cell may be same or different from other cells.

Thus, it becomes desirable to schedule radio resources, e.g., in the uplink, to users to maximize throughput within the confines of ensuring that the system remains stable. One conventional way to do this is to schedule the users to maximize throughput subject to power saturation at the user. However, this requires the channel gains from the user to the Node B (e.g., WCDMA base station) to be known to the scheduler.

But in one or more aspects, an alternative formulation of uplink scheduling is proposed. In the proposed scheme, the uplink scheduling problem is reformulated as a load scheduling problem in the uplink. In WCDMA for example, uplink scheduling may be performed to maintain interference constraints related to coverage on top of ensuring cell stability. The coverage constraint is typically expressed in terms of RoT or rise over thermal, which is closely related to the load, expressed as load factors. For these reasons, scheduling in terms of the additive load factors may actually be more appropriate than using powers given the information available at the radio node, e.g., the base station.

From the discussion above, it is seen that the interference coupling between the cells—e.g., between macro and pico cells and/or between one pico cell and another pico cell— may influence scheduling efficiency and stability of the system. A problem then may be described as how to distribute the available radio resources—e.g., free headroom—among the cells so as to achieve maximum performance subject to stability constraint. To state it another way, a design question may be how to allocate the total load among the cells while retaining overall system stability.

To address the scheduling issues, a semi-decentralized scheduling of users is proposed. In one aspect, the proposed semi-decentralized scheduling scheme may be summarized as: (1) centrally allocating portions of the total load or available headroom to each local node subject to system stability, and (2) locally granting resources (e.g., uplink resources) to users subject to the locally allocated portion of the load or headroom.

Figure 7:
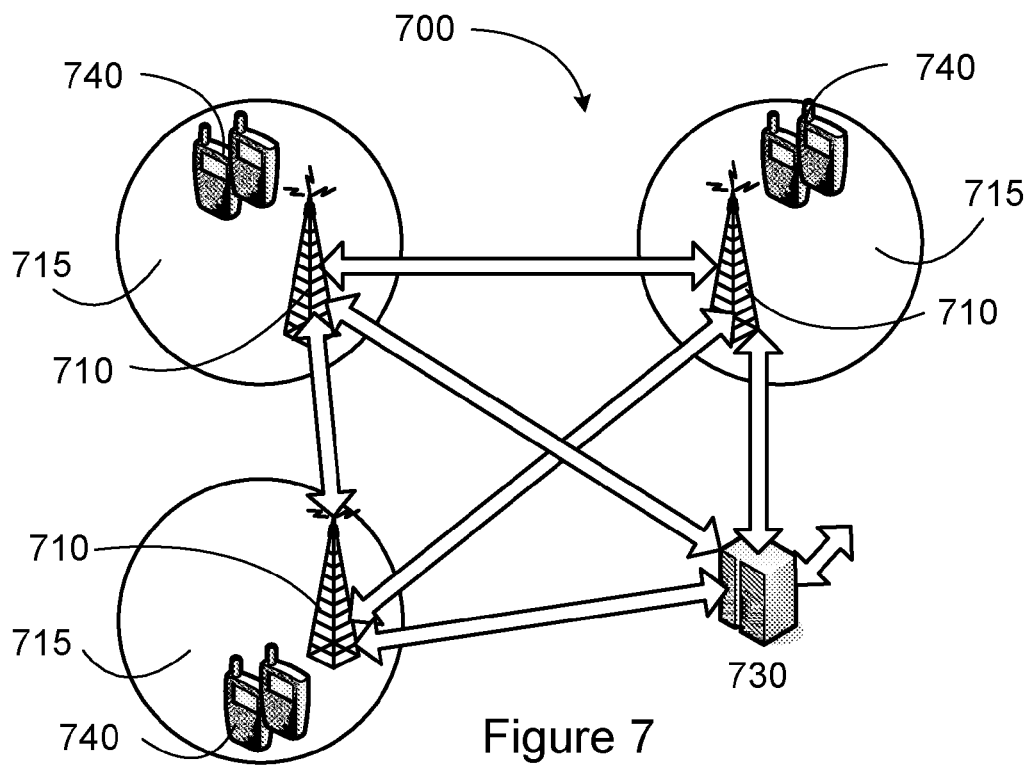
FIG. 7 illustrates an example scenario in which semi-decentralized scheduling may be applied.

FIG. 7 illustrates an example scenario in which the proposed semi-decentralized scheduling may be applied. In the wireless network 700 of the figure, three radio nodes 710 and their corresponding cells 715 are shown. Each radio node 710 may be capable of providing wireless services to users 740 located within its corresponding cell 715. Examples of radio nodes 710 include Node B, eNB, base station, access point, macro node, pico node, and so on.

For purposes of semi-decentralized scheduling, each cell 715 may be considered to be local. In this scenario, the total headroom available to the system as whole, i.e., available to the three cells 715 of the network 700, may be determined. For each cell 715, a portion of the available headroom may be allocated. The allocation may be performed by a central scheduler which takes into consideration the stability of the network 700. For each local cell 715, radio resources may be granted to the users 740 in that local cell 715. The resource grants may be performed by a local scheduler which takes into consideration the portion of the headroom allocated to that local cell 715. For purposes of discussion, it is assumed that there is a local scheduler associated with each local cell 715, and the associated local scheduler may grant radio resources, subject to the allocated headroom, to the users 740 located in that local cell 715.

Figure 8:
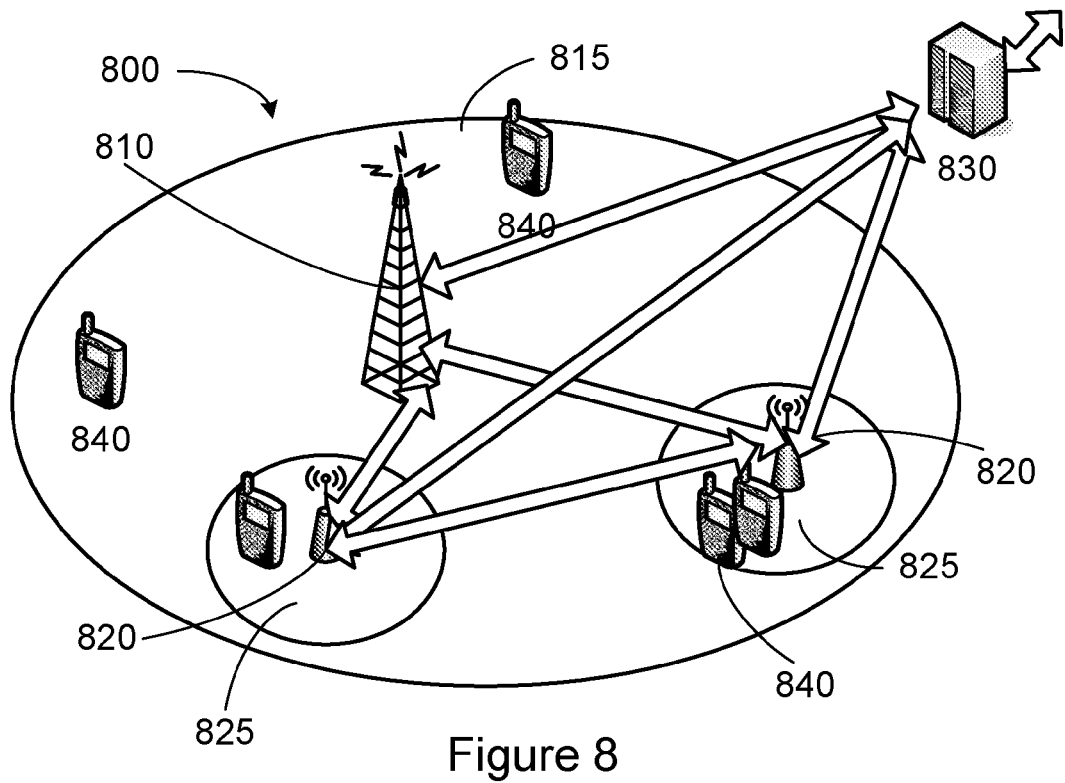
FIG. 8 illustrates an example scenario in which semi-decentralized scheduling may be applied in a HetNet setting.

FIG. 8 illustrates an example scenario which semi-decentralized scheduling may be applied in a HetNet setting, and may be viewed as representing a particular example of FIG. 7. In the network 800 of FIG. 8, three radio nodes (macro node 810 and two pico nodes 820) and their corresponding cells (macro cell 815 and two pico cells 825) are shown. The macro node 815 may be capable of providing wireless services to users 840 located in the macro cell 815, and the pico nodes 820 may each be capable of providing wireless services to users 840 located within their corresponding pico cells 825. Since the users 840 located in the pico cells 825 are also within the macro cell 815, it is possible for the macro node 810 to serve these users 840 as well. However, it is preferred that whenever possible, users 840 located within the pico cells 825 be served by the corresponding pico nodes 820. This enables the macro node 810 to better serve users 840 that are not part of any pico cell 825.

For semi-decentralized scheduling, the macro cell 815 and each pico cell 825 may be considered to be local cells. For each local cell 815, 825, a portion of the total available headroom may be allocated, e.g., by a central scheduler, taking into account the stability of the network 800. For each local cell 815, 825, radio resources may be granted to the users 840 in that local cell 815, 825, e.g., by an associated local scheduler, taking into account the portion of the headroom allocated to that local cell 815, 825. Preferably, each local cell 815, 825 includes or is otherwise associated with an own local scheduler.

Figure 9:
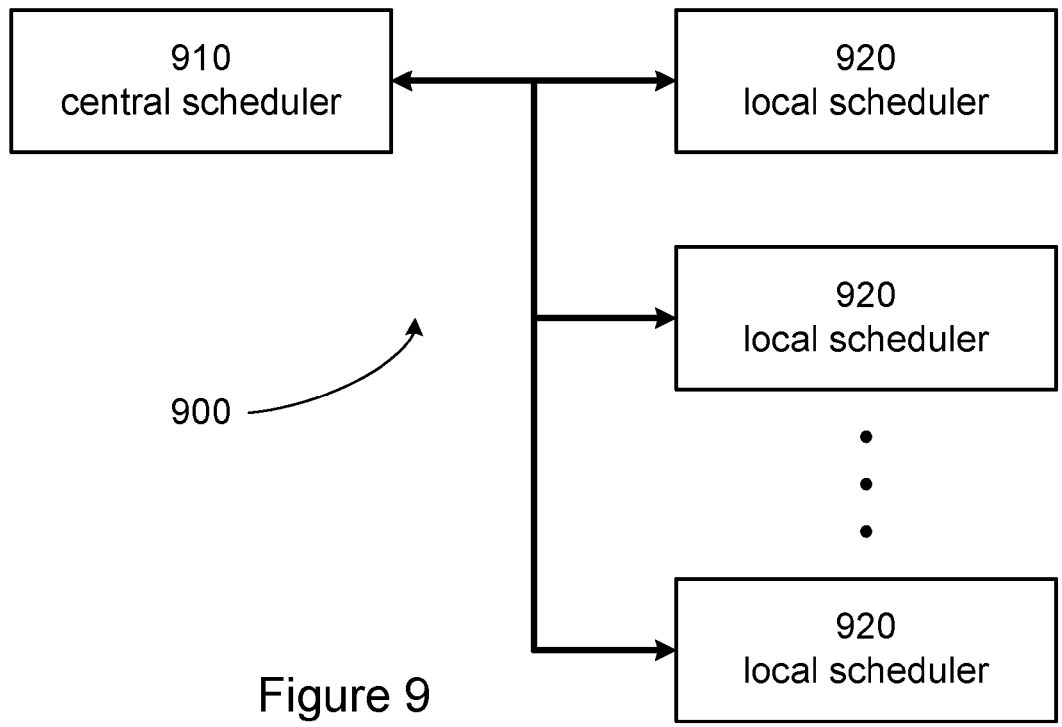
FIG. 9 illustrates an example system structured to perform semi-decentralized scheduling.

FIG. 9 illustrates a system structured to perform an aspect of the proposed semi-decentralized scheduling. The system 900 may include a central scheduler 910 and a plurality of local schedulers 920. The central scheduler 910 may be structured to centrally allocate the total load or headroom among the plurality of local schedulers 920. Each local scheduler 920 may be structured to schedule users located in a cell associated with that local scheduler 920. To state it another way, each local scheduler 920 may be structured to schedule users served by a radio node associated with that local scheduler 920.

In one aspect, the system 900 may be implemented in networks. Referring to the network 700 in FIG. 7 for example, the central scheduler 910 may be included in any node of the network 700. In one embodiment, the central scheduler 910 may be included in a radio network scheduler (RNC) 730 of the network 700. In another embodiment, the central scheduler 910 may be included in one of the radio nodes 710 instead of the RNC 730.

For local scheduling, in one embodiment, each radio node 710 may include a local scheduler 920 structured to grant radio resources to users 740 being served by that radio node 710. In another embodiment, local scheduling for one or more cells 715, i.e., for one or more radio nodes 710, may be managed from a different node. For example, the RNC 730 may perform local scheduling for one or more of the radio nodes 710. As another example, one of the radio nodes 710 may include a local scheduler 920 for itself and another local scheduler 920 for another radio node 710.

The bidirectional arrows among the network nodes (radio nodes 710 and RNC 730) indicate that the central scheduler 910 and the local schedulers 920 may communicate with each other to enable the semi-decentralized scheduling to take place. It is seen that there is a possibility of a network node, e.g., the RNC 730 or one or the radio nodes 710, includes the central scheduler 910 and at least one local scheduler 920.

The central scheduler 910 and/or each of the local schedulers 920 may be implemented purely in hardware, or as a combination of hardware and software. Note that a computer processor at the network node 710, 730 may execute software stored in a storage medium and/or received over a transmission medium.

The system 900 may also be implemented in the HetNet 800 in FIG. 8. In one embodiment, each radio node—macro node 810 and each pico node 820—may include a local scheduler 920 for granting radio resources to users being served by that radio node. The central scheduler 910 may be included in any of the network nodes such as the RNC 830, the macro node 810, or in one of the pico nodes 820.

Figure 10:
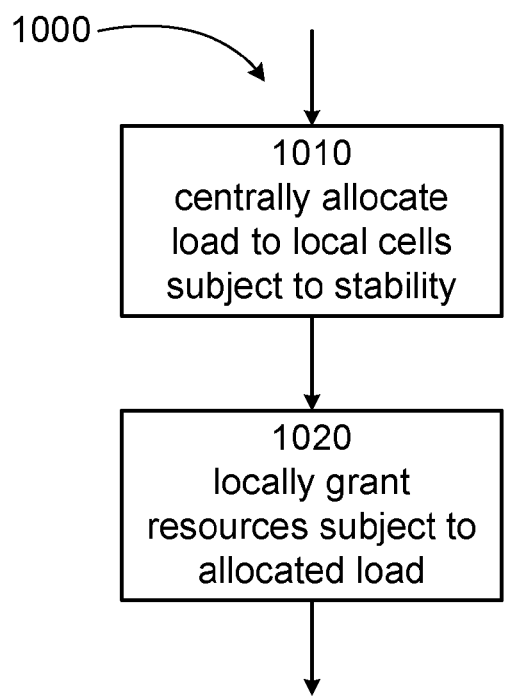
FIG. 10 illustrates a flow chart of an example method of semi-decentralized scheduling.

FIG. 10 illustrates a flow chart of an example method performed by the system 900 for semi-decentralized scheduling. In step 1010, the central scheduler 910 may allocate a load headroom (or simply load) to each of the plurality of local schedulers 920. As will be described in further detail below, the central scheduler 910 may allocate the load to each local scheduler 920 subject to a stability constraint. In other words, each local scheduler 920 may be allocated a portion of the total load headroom such that the system 900 as a whole remains stable (if already stable) or becomes stable (if not already stable). The central scheduler 910 may allocate the available load headroom among the plurality of local schedulers 920 so as to maximize overall performance (e.g., aggregate or average throughput) while keeping within the stability constraint. In an embodiment, the performance may be weighted for each cell and/or for each user. In this instance, the central scheduler 910 may allocate the load headroom so as to maximize the weighted performance. In step 1020, each local scheduler 920 may grant, i.e., schedule radio resources to the users 740, 840 located in a local cell 715, 815, 825 associated with that local scheduler 920 subject to the headroom allocated to that local scheduler 920.

The semi-decentralized scheduling scheme combines advantageous aspects of both local and centralized scheduling. In general, uplink scheduling benefits from using local information on e.g. user demands and radio environment. However, scheduling stability is a system property and depends on concurrent behaviors of several cells. Thus, some sort of central coordination is preferred to secure system stability without using a too large scheduling back off. A large scheduling back off often leads to poor resource utilization since the system is operated at a generally low load just to be able to handle occasional load peaks caused by e.g. user mobility.

As indicated above, in one or more aspects of the proposed semi-decentralized scheduling scheme, the uplink scheduling problem may be reformulated as a load scheduling problem. The reformulation of uplink scheduling to load scheduling is explained as follows. Suppose there are n users in a cell. Then the signal-to-interference (SIR) ratio for the $i^{th}$ user may be modeled as:

$$\bar{S}_i = \frac{\bar{p}_i}{\sum_{j=1, j \neq i}^{n} (1 + \bar{\gamma}_j)\bar{p}_j + \bar{\alpha}(1 + \bar{\gamma}_i)\bar{p}_i + \bar{N}_0} \quad (1)$$

in which $\bar{p}_i$ represents the total received power; $(1+\bar{\gamma}_j)\bar{p}_j$ represents the total received power from the $j^{th}$ user; $\bar{\alpha}(1+\bar{\gamma}_i)\bar{p}_j$ represents the self interference; $\bar{N}_0$ represents thermal and inter-cell interference; $\bar{\gamma}_i$ represents the scaling factor and includes the scaling factors of the non-enhanced data channel and enhanced uplink channels; and $\bar{\alpha}$ represents self interference factor describes the fraction of total received power from the user which behaves as interference to itself.

The SIR should not be viewed in a limiting sense. Rather, it should be viewed to encompass any parameter or parameters that conceptualize the presence of desired signals and undesired signals. Some examples include SINR (signal-to-noise-plus-interference ratio), CIR (carrier-to-interference ratio), SNR (signal-to-noise ratio) and so on. Indeed, parameters indicating quality of the signaling environment (e.g., BER (bit error rate), FER (frame error rate), and so on) may also be encompassed.

Since the scaling factor for each user i determines the SIRs of the data channels and hence the user's throughput rate (e.g., bit rate, symbol rate, etc.), it then follows that a measure of the cell throughput may be represented as follows:

$$J(\bar{\gamma}_1 \ldots \bar{\gamma}_n) = \sum_{i=1}^{n} \bar{\gamma}_i \quad (2)$$

Then maximizing the cost function J may be viewed as maximizing the throughput of the cell, which can be accomplished by maximizing the sum of scaling factors of users. The throughput maximization may be subject to load constraints.

The load factor for each user may be defined as follows:

$$L_i = \frac{1 + \bar{\gamma}_i}{\frac{1}{\bar{S}^*} + (1 - \bar{\alpha})(1 + \bar{\gamma}_i)} = g(\bar{\gamma}_i) \quad (3)$$

in which $\bar{S}^*$ represents a target SIR for maintaining a satisfactory performance such as block error rate. A typical value of $\bar{S}^*$ is 1/64. This is merely an example value for S* and should not be taken to be limiting. The user load factor $L_i$ in (3) may be viewed as a ratio of the received power from the $i^{th}$ user to the received total wideband power $P_{RTWP}$.

Conversely, the scaling factor $\bar{\gamma}_i$ is related to the load factor $L_i$ as follows:

$$\bar{\gamma}_i = f(L_i) = g^{-1}(L_i) = \frac{\frac{L_i}{\bar{S}^*} - 1 + L_i(1 - \bar{\alpha})}{1 - L_i(1 - \bar{\alpha})} \quad (4)$$

It can be shown that the function $f(L_i)$ in (4) can be well approximated by a quadratic function $\hat{f}(L_i)$ as follows. Note that $f(L_i)$ in (4) can be written as:

$$f(L_i) = \frac{1}{\bar{S}^*(1 - \bar{\alpha})}h(u) - 1 \text{ where} \quad (5)$$

$$h(u) = \frac{u}{1 - u} \text{ and } u = \bar{L}_i(1 - \bar{\alpha}).$$

If an approximation is made in the form of $h(u) \approx m_2 u^2 + m_1 u + m_0$ is made, then $f(L_i)$ maybe approximated by a quadratic function as follows:

$$f(L_i) \approx \hat{f}(L_i) = \frac{1}{\bar{S}^*(1 - \bar{\alpha})}[m_2 u^2 + m_1 u + m_0] - 1 \quad (6)$$

$$f(L_i) \approx \hat{f}(L_i) = c_2 L_i^2 + c_1 L_i + c_0 \quad (7)$$

where $$c_2 = \frac{m_2}{\bar{S}^*}(1 - \bar{\alpha}), \, c_1 = \frac{m_1}{\bar{S}^*}, \text{ and } c_0 = \frac{m_0}{\bar{S}^*(1 - \bar{\alpha})} - 1.$$

The approximating function $\hat{f}(L_i)$ in (7) is also equivalent to the quadratic function of the form:

$$f(L_i) \approx \hat{f}(L_i) = a(L_i - c)^2 + d \quad (8)$$

where a=138.3, c=−0.09, and d=0.63 when $\bar{S}^*$ is taken as 1/64. Since $\hat{f}(L_i)$ represents approximated scaling factors and since throughput can be maximized by maximizing the scaling factors (see equation (2)), then it would be desirable to maximize the approximating function $\hat{f}(L_i)$. According to (8), maximizing $\hat{f}(L_i)$ is equivalent to maximizing $(L_i - c)^2$.

It is then possible to replace the cost function J of equation (2) by an approximate cost function $\hat{J}$ as follows:

$$\hat{J}(L_1 \ldots L_n) = \sum_{i=1}^{n} (L_i - c)^2 \quad (9)$$

The load factor for each user should also satisfy $$L_i \geq L_p \quad (10)$$

in which $L_p$ corresponds to the load required for a control channel only. An example of the control channel is DPCCH (downlink physical control channel). When $\bar{S}^*$ is taken as $\frac{1}{64}$, $L_p = g(0) \approx 0.0155$.

The approximate cost function $\hat{J}$ of (9) represents the cost function of a cell (e.g., for any particular cell) that should be maximized for the cell. It can be seen that the issue of maximizing $\hat{J}$ subject to load constraints now involves maximization of a convex cost function on a convex set, and can be solved in a relatively straight forward manner. The scheduling problem can now be formulated as follows:

$$\text{Maximize } J'(L_1 \ldots L_n) = \sum_{i=1}^{n} w_i (L_i - c)^2 \quad (11)$$

in which $w_i$ in denote a weighting corresponding to the $i^{th}$ user (more on weightings provided later). In one sense, the approximate cost function $J'$ in (11) may be viewed as a more general form of the approximate cost function $\hat{J}$ of (9). Note that if $w_i = 1$ for each user (e.g., for each user in the particular cell), then the cost functions $J'$ and $\hat{J}$ are the same.

The cost function $J'$ maximization may be subject to the following constraints:

$$L_i \geq L_{il}, \quad (12)$$

$$L_i \leq L_{iu}, \quad (13)$$

and $$\sum_{i=1}^{n} L_i \leq L_{HR}. \quad (14)$$

The lower bound $L_{il}$ in (12) may correspond to the minimum load required by the $i^{th}$ user. In one embodiment, the lower bound may be the load $L_p$ of the control channel (e.g., of DPCCH) such that $L_i \geq L_p$. The upper bound $L_{iu}$ in (13) may correspond to the maximum load that the $i^{th}$ user may use or deploy. The load headroom $L_{HR}$ in (14) may correspond to the maximum allowable interferences from the scheduled users.

The weightings $w_i$ in (11) may be used to achieve various design objectives. For example, the weighting $w_i$ for each user may be dynamically assigned to ensure fairness. A scheduler that ensures fairness (e.g., through weighting) may be referred to as a WTWF (weighted throughput with fairness) scheduler. One suitable choice for $w_i$ for fairness is:

$$w_i = \frac{x_{av}}{x_i} \quad (15)$$

where $x_{av}$ represents the moving average throughput for all users and $x_i$ represents the throughput for the $i^{th}$ user.

In one aspect, it is desirable to choose the weights such that the throughput $x_i(k)$ is smoothed for some or all users. For example, k may represent a time interval and weights may be chosen such that $$w_i(k+K) = \frac{x_{av}(k)}{x_i(k)} = \frac{\sum_{i=1}^{n} x_i(k)/n}{x_i(k)} \quad (16)$$

where K is a positive integer such that k+K represents a time interval that is K number of scheduling intervals into the future. If K=1, then the weights for the next scheduling interval are determined based on the throughputs of the current interval. Smoothing may be performed by applying a low pass filter for the $i^{th}$ user as follows:

$$x_i(k+1) = \lambda x_i(k) + (1-\lambda)\bar{\gamma}_i(k). \quad (17)$$

It should be noted that weightings $w_i$ may be fixed or dynamic. At each interval, the weightings may be fixed for zero or more users, and may be dynamically determined for zero or more other users. Between any two intervals, the weighting of any user may be the same or different. Also, the weighting of any user may be fixed in one interval and dynamically determined in another. In short, the weightings may be determined in any number of ways.

A scheduler according to an embodiment of the disclosed subject matter is now described. The described scheduler may be a local scheduler 920 associated with a cell 715, 815, 825, and structured to schedule radio resources for the users 740, 840 being served by the cell 715, 815, 825.

The local scheduler 920 may rank the users 740, 840 as follows:

$$\rho_1 \geq \rho_2 \geq \ldots \geq \rho_n, \quad (18)$$

$$\rho_i = w_i(\min\{L_{iu}, L_F + L_{il}\} + L_{il} - 2c), \quad (19)$$

$$L_F = L_{HR} - \sum_{i=1}^{n} L_{il} \quad (20)$$

where $L_F$ represents the free headroom available to the cell, i.e., free headroom locally available to the local scheduler 920. Recall this may be allocated by the central scheduler 910 using same or similar considerations as the local scheduler 920.

Referring back to the local scheduler 920, consider a situation in which the following are assumed: $L_{il}$ and $L_{iN}$ are constants, $L_{iu} < L_F + L_{il}$, and $L_{il} = L_p$. Then $\rho_i(k)$, the rank of the $i^{th}$ user at interval k may be given by:

$$\rho_i(k) = \frac{r_i}{x_i(k)} x_{av}(k), \quad (21)$$

$$r_i = L_{iu} + L_p - 2c. \quad (22)$$

In (22), $r_i$ may be viewed as the available user load.

Since the average throughput $x_{av}(k)$ does not affect user rankings, an equivalent ranking metric may be defined as follows:

$$\hat{\rho}_i(k) = \frac{\rho_i(k)}{x_{av}(k)} = \frac{r_i}{x_i(k)} \quad (23)$$

This implies that $$\frac{1}{\hat{\rho}_i(k)} = \frac{x_i(k)}{r_i} \quad (24)$$

In (24), the quantity $1/\hat{\rho}_i(k)$ may be viewed to represent a weighted throughput for the user i where the weighting is $w_i = 1/r_i$. If the local scheduler 920 applies smoothing (e.g., the low pass filter of equation (17), then the quantity $1/\hat{\rho}_i(k)$ may be viewed as weighted smoothed throughput for the user.

The local scheduler 920 may attempt to equalize the weighted throughputs of the users 740, 840. As a consequence, the throughput ratio between users $i_1$ and $i_2$ resulting from the local scheduler 920 may be approximately equal to the ratio of the $\{r_i\}$'s, i.e.:

$$\frac{x_{i_0}(k)}{x_{i_1}(k)} = \frac{r_{i_0}}{r_{i_1}} \quad (25)$$

The quantity $x_{i_0}(k)/x_{i_1}(k)$ may be viewed as an achieved throughput ratio and the quantity $r_{i_0}/r_{i_1}$ may be viewed as a nominal user load ratio.

It follows that the nominal throughput fraction $\hat{\theta}_i$ of a particular user $i_0$ is given by $$\hat{\theta}_{i_0} = \frac{r_{i_0}}{\sum_{i=1}^{n} r_i} \quad (26)$$

Then for a given throughput distribution set (e.g., set of $\hat{\theta}_i$'s), an upper bound on the throughput of the cell 715, 815, 825 may be calculated as follows:

$$\Gamma_{MAX} = \frac{\sum_{i=1}^{n} \hat{\theta}_i}{\left(\sum_{i=1}^{n} \frac{\hat{\theta}_i}{\overline{\gamma}_{iu}} L'_{iu}\right)/L_F} = L_F \frac{\sum_{i=1}^{n} \hat{\theta}_i}{\sum_{i=1}^{n} \frac{\hat{\theta}_i}{\overline{\gamma}_{iu}} L'_{iu}} \quad (27)$$

where $L'_{iu} = L_{iu} - L_p$, $L_p$ is the load for the control channel (e.g., DPCCH), $\overline{\gamma}_{iu}$ is the value of $\overline{\gamma}$ which corresponds to $L_{iu}$, and $L_F = L_{HR} - nL_p$ is the free headroom. One way to derive the above expression is to observe that if each user is allocated a load of $(\hat{\theta}_i/\overline{\gamma}_{iu})L'_{iu}$, then the corresponding throughput is bounded above by $(\hat{\theta}_i/\overline{\gamma}_{iu})\overline{\gamma}_{iu} = \hat{\theta}_i$. Moreover, the denominator may represent time (e.g., in TTIs) taken for this schedule (set of allocations). It follows that $\Gamma_{MAX}$ represents an upper bound on the average throughput for this schedule.

An important observation flowing from the above discussion is that the throughput $\Gamma_{MAX}$ is affine in the total load $L_{HR}$ allocated to the cell under consideration.

In multi-cell scheduling, overall multi-cell stability—e.g., system stability—is an important consideration. A situation in which a single pico cell 825 is embedded in a macro cell 815 is used for explanation purposes. Let n denote the total number of users 840 and let $n_A$ denote the number of users 840 who 'belong' to the macro cell 815 (as opposed to the pico cell 825). That is, it is may be assumed that users $1, \ldots, n_A$ belong to the macro cell 815 and that users $n_A+1, \ldots, n$ belong to the pico cell 825.

Let $\phi_i^t$ represent the total power transmitted by user i and let the subscripts (or superscripts) 'A' and 'B' denote quantities corresponding to the macro and pico cells 815, 825, respectively. For the purpose of analyzing the stability of the system we assume that the power received at base station 'x' from user i may be given by:

$$\phi_{xi} = \frac{k_x}{r_{xi}^{3.52}} \phi_i^t \quad (28)$$

in which x represents the base station 'A' (macro node 810) or 'B' (pico node 820) and $k_x$ represents an antenna gain.

However, a more generalized form of (28) may be represented in equation (29) as follows:

$$\phi_{xi} = g_{xi}\phi_i^t \quad (29)$$

In equation (29), x also represents the base station 'A' (macro node 810) or 'B' (pico node 820), $g_{xi}$ represents the channel power gain which depends on the antenna gain and the distance of user i from the base station 'x'. Then coupling factors may be defined such that:

$$\phi_{Ai} = u_{Ai}\phi_{Bi} \quad (30)$$

for $i = n_A+1, \ldots, n$ and $$\phi_{Bi} = u_{Bi}\phi_{Ai} \quad (31)$$

for $i = 1, \ldots, n_A$.

In (30), for each user in the pico cell 825, i.e, for each user $i = n_A+1, \ldots, n$, $\phi_{Bi}$ represents the received power seen at the pico node 'B' due to that user, and $\phi_{Ai}$ represents the interference seen at the macro node 'A' due to the same user. Similarly, in (31), for each user in the macro cell 815, i.e, for each user $i = 1, \ldots, n_A$, $\phi_{Ai}$ represents the received power seen at the macro node 'A' due to that user, and $\phi_{Bi}$ represents the interference seen at the pico node 'B' due to the same user.

For the base station 'x', let $I_{tot}^x$ denote total received power, $I_{other}^x$ denote other cell interference power and $N_0^x$ denote thermal noise power. The received power at the macro node 'A' can then be written as:

$$I_{tot}^A = \sum_{i=1}^{n_A} \phi_{Ai} + \sum_{i=n_A+1}^{n} u_{Ai}\phi_{Bi} + I_{other}^A + N_0^A \quad (32)$$

The first term $\sum_{i=1}^{n_A} \phi_{Ai}$ on the right hand side of (32) represents the portion of the total received power $I_{tot}^A$ due to transmissions of the users of the macro node 'A'. This term can be written as $L_A I_{tot}^A$, where $L_A = \sum_{i=1}^{n_A} L_{Ai}$ and $L_{Ai}$ represents the load factor for each user i.

The second term $\sum_{i=n_A+1}^{n} u_{Ai}\phi_{Bi}$ represents the contribution to the total received power $I_{tot}^A$ at the macro node 'A' due to transmissions of users of the pico node 'B'. The second term may be approximated by $u_{AB}L_B I_{tot}^B$. An explanation for the approximation is as follows. In (30), $u_{Ai}$ relates the coupling of the interference that occurs at the macro node 'A' due to transmission from the user that belongs to the pico cell 825. The coupling relation $u_{Ai}$ of one pico node user to the macro node 'A' will likely differ from that of another pico node user. However, since the coverage area of the pico node 'A', i.e., the pico cell 825, is confined to a known geographical region, the coupling relations $u_{Ai}$ of the users of the pico node 'B' to the macro node 'A' are likely to be within a given range. In such circumstances, a constant value $u_{AB}$ (e.g., an average) may be assumed for $u_{Ai}$. Then the second term may be rewritten as $u_{AB} \sum_{i=n_A+1}^{n} \phi_{Bi} = u_{AB}L_B I_{tot}^B$. Then (32) may be rewritten as follows:

$$I_{tot}^A = L_A I_{tot}^A + u_{AB}L_B I_{tot}^B + I_{other}^A + N_0^A \quad (33).$$

Similarly, the received power at the pico node 'B' may be written as $$I_{tot}^B = L_B I_{tot}^B + u_{BA}L_A I_{tot}^A + I_{other}^B + N_0^B \quad (34).$$

In (33), $u_{AB}$ may be viewed as the coupling factor that couples the interference that occurs at the macro node 'A' due to the transmissions of users of the pico node 'B'. In other words, $u_{AB}$ may be viewed as the coupling factor for the cell pair in the direction to the macro cell ('A') from the pico cell ('B'). In other words, $u_{AB}$ couples the interference that occurs at the macro cell 815 due to transmissions from users of the pico cell 825. Conversely, $u_{BA}$ in (34) may be viewed as the coupling factor for the cell pair in the direction to the pico cell 825 from the macro cell 815. While the coupling factors may be treated as constants in one or more aspects, one should keep in mind that the coupling factors in actuality depend on, among others, the distribution of the users and the number of users in the cells. As such, the coupling factors may vary over time. Thus, in one aspect, the the coupling factors $u_{AB}$ and $u_{BA}$ may be updated from time to time.

Equations (33) and (34) may be rewritten as:

$$\begin{bmatrix} I_{other}^A + N_0^A \\ I_{other}^B + N_0^B \end{bmatrix} = M \begin{bmatrix} I_{tot}^A \\ I_{tot}^B \end{bmatrix} = \begin{bmatrix} 1 - L_A & -u_{AB}L_B \\ -u_{BA}L_A & 1 - L_B \end{bmatrix} \begin{bmatrix} I_{tot}^A \\ I_{tot}^B \end{bmatrix} \quad (35)$$

If $I_{other}^A$ and $I_{other}^B$ are zeros or constants, then the system will be stable if the solution to the above set of equations satisfies $I_{tot}^A > 0$ and $I_{tot}^B > 0$. It follows that the system is stable (for all $N_0^A$ and $N_0^B$) if and only if $M^{-1}$ is a positive matrix (i.e., a matrix with positive entries).

For multiple cells, the expression for M may be generalized as follows:

$$M = I - AD_L \quad (36)$$

where I is the identity matrix, $$A = \begin{bmatrix} 1 & u_{12} & \cdots & u_{1c} \\ u_{21} & 1 & \cdots & u_{2c} \\ \vdots & \vdots & \ddots & \vdots \\ u_{c1} & u_{c2} & \cdots & 1 \end{bmatrix}$$

represents the coupling matrix, c is the number of cells, each $u_{xy}$ represents the coupling of interferences occurring in cell x due to users in cell y, $D_L = \text{diag}(L)$, $L = [L_{HR1}, L_{HR2}, \ldots, L_{HRc}]^T$ is the load vector or matrix, and $L_{HRy}$ is the total load in cell y. Since $AD_L$ is a positive matrix, then a necessary and sufficient condition for stability is given by $$\rho(AD_L) < 1 \quad (37)$$

where $\rho(\cdot)$ denotes the spectral radius of a matrix (maximum value of $|\lambda_i|$, where the $\lambda_i$'s are the eigenvalues of the matrix).

It is now possible to bring the components together in discussing load allocation among the cells. In equation (26), the nominal throughput fraction of a particular user $i_0$ is given as $$\hat{\theta}_i = \frac{r_{i_0}}{\sum_{i=1}^n r_i}.$$

When WTWF scheduler is used, this may also be viewed optimally fair throughput fraction for the user.

Equation (26) may be generalized so that the throughput fraction $\hat{\theta}_{ji}$ of a particular user $i_0$ in a particular cell $j_0$ is given by:

$$\hat{\theta}_{j_0 i_0} = \frac{r_{j_0 i_0}}{\sum_{i=1}^{n_1} r_{1i} + \sum_{i=1}^{n_2} r_{2i} + \ldots + \sum_{i=1}^{n_c} r_{ci}} \quad (38)$$

In (38), $n_j$ represents the number of users of the $j^{th}$ cell. Then the throughput fraction $\hat{\Theta}_j$ for the particular cell $j_0$ cell may be given by:

$$\hat{\Theta}_{j_0} = \frac{\sum_{i=1}^{n_{j_0}} r_{j_0 i}}{\sum_{i=1}^{n_1} r_{1i} + \sum_{i=1}^{n_2} r_{2i} + \ldots + \sum_{i=1}^{n_c} r_{ci}} \quad (39)$$

As explained above, the upper bound on the total throughput is affine in the total loads allocated to the cells. In particular, it follows from (27) that the total throughput $\Gamma_{TOT}$ can be written in the form:

$$\Gamma_{TOT} = \sum_{j=1}^{c} \hat{k}_j L_{Fj} \quad (40)$$

where $L_{Fj} = L_{HRj} - n_j L_p$ represents the free headroom allocated to the $j^{th}$ cell, $\hat{k}_j L_{Fj}$ represents an upper bound on the throughput for the same $j^{th}$ cell, and $L_{HRj}$ represents the load headroom (maximum allowable interference) of the $j^{th}$ cell.

To ensure overall stability, the following is required (see also (37)):

$$\rho(AD_L) \leq L_{stab} < 1 \quad (41)$$

where $1 - L_{stab}$ represents the stability margin. This is a settable value when designing schedulers. A large stability margin may represent a relatively conservative scheduler design and a small margin may represent a relatively aggressive design.

Putting these multiple factors together, the multi-cell (e.g., pico-macro cell) load scheduling can be expressed as maximizing the total throughput $$\Gamma_{TOT} = \sum_{j=1}^{c} \hat{k}_j L_{Fj}$$

of (40) subject to:

$$\frac{\hat{k}_{j_0} L_{Fj_0}}{\hat{k}_{j_1} L_{Fj_1}} = \frac{\hat{\Theta}_{j_0}}{\hat{\Theta}_{j_1}} \quad (42)$$

and $$\rho(AD_L) \leq L_{stab} \quad (43)$$

One solution to this issue of multi-cell scheduling is provided as follows:

$$L_F = \begin{bmatrix} L_{F1} \\ L_{F2} \\ \vdots \\ L_{Fc} \end{bmatrix} = a \begin{bmatrix} \hat{\Theta}_1 / \hat{k}_1 \\ \hat{\Theta}_2 / \hat{k}_2 \\ \vdots \\ \hat{\Theta}_c / \hat{k}_c \end{bmatrix} \quad (44)$$

where the scalar a is chosen such that $$\rho(AD_L) = L_{stab}. \quad (45)$$

Then in one aspect, the semi-decentralized scheduling involves allocating the load to each cell according to (44)

and (45). This corresponds to the step 1010 performed by the central scheduler 910 (see FIG. 10). To perform the central load allocation, the central scheduler 910 should know the following quantities:

(a) Coupling factors $u_{xy}$ (coupling of interferences experienced in cell x due to cell y);

(b) Number of users $n_j$ or minimum load $\Sigma_{i=1}^{n_j} L_{ji}$ (e.g., $n_j L_p$) for each cell j;

(c) Throughput proportionality $\hat{k}_j$ for each cell j, which relates an upper bound on the throughput to the free headroom (see also (27));

(d) Throughput distribution $\Sigma_{i=1}^{n_j} r_{ji}$ for each cell j, which is a quantity that may be used to calculate the throughput fraction (see 39). This quantity may be said to describe relative throughputs of the cells, or alternatively, describe the ratio of the throughputs.

The central scheduler 910 may use quantities (a) (coupling factors $u_{xy}$) to determine the matrix A of equation (45) (see also (36)). Recall that the coupling factor $u_{xy}$ relates or otherwise describes the interference experienced at cell x due to transmissions from users of cell y. The coupling factors $u_{xy}$ for each pair of cells x and y may be known to the central scheduler 910, i.e., the quantities (a) need not be reported to the central scheduler 910 from the local schedulers 920.

On the other hand, quantities (b), (c) and (d) should be reported for each local cell j to the central scheduler 910. In reporting the quantity (b) for each cell j, the local scheduler 920 associated with that cell may simply report the number of users $n_j$ of that cell. The central scheduler 910 then may use $n_j$ to determine the minimum load of the cell. In one embodiment, the central scheduler 910 may simply multiply n by the control channel load $L_p$ (e.g., of DPCCH) to arrive at the minimum load $n_j L_p$ required in cell j. In another embodiment, the local scheduler 920 may provide the minimum load $\Sigma_{i=1}^{n_j} L_{ji}$ to the central scheduler 910. Using the minimum required load for each cell, the central scheduler 910 may calculate or otherwise determine the free headroom $L_{Fj} = L_{HRj} - n_j L_p$ to be allocated to that cell (see discussion following equation (40)).

In reporting the quantity (d) (throughput distribution $\Sigma_{i=1}^{n_j} r_{ji}$ of a cell), this may be viewed as each local scheduler 920 reporting to the central scheduler 910 the numerator of equation (39) corresponding to the cell. The central scheduler 910 may use the throughput distribution $\Sigma_{i=1}^{n_j} r_{ji}$ of each cell to arrive at the throughput fraction $\hat{\Theta}_j$ of each of the cells.

Having received or determined the minimum load $\Sigma_{i=1}^{n_j} L_{ji}$ (e.g., based on the number of users in each cell), the throughput fraction $\hat{\Theta}_j$ (e.g., based on the throughput of each cell) and $\hat{k}_j$ (of each cell) along with the coupling matrix A (based on the coupling factors between cells), the central scheduler 920 may determine the free headroom $L_{Fj}$ to be allocated to each cell.

Then each local scheduler 920, in implementing step 1020, may schedule the users of the corresponding cell j subject to the allocated free headroom $L_{Fj}$, i.e., grant resources to the cell's users such that the load resulting from the grants does not exceed $L_{Fj}$. As long as the free headroom $L_{Fj}$ is not exceeded for each cell, system stability is guaranteed.

Figure 11:
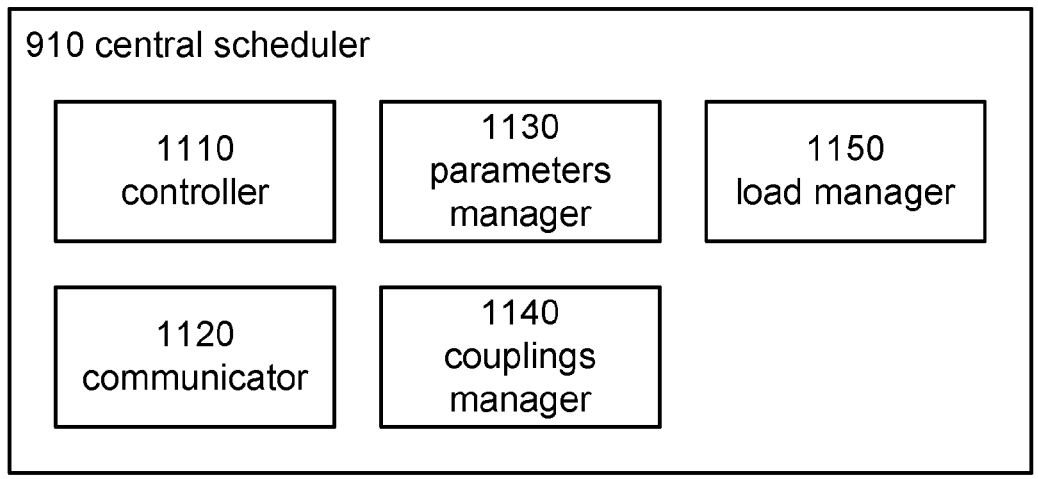
FIGS. 11 and 12 illustrate embodiments of a central scheduler structured to perform semi-decentralized scheduling.

FIG. 11 illustrates an embodiment of the central scheduler 910 structured to schedule radio resources to users 740, 840 located in a plurality of cells 715, 815, 825 of a wireless network 700, 800. As seen, the example central scheduler 910 may include a scheduler 1110, a communicator 1120, a parameters manager 1130, a couplings manager 1140 and a load manager 1150. The communicator 1120 may be structured to communicate with a plurality of radio nodes 710, 810, 820 of the network 700, 800, and in particular, communicate with the plurality of local schedulers 920 associated with the radio nodes 710, 810, 820. The parameters manager 1130 may be structured to manage load related parameters of the plurality of cells 715, 815, 825 corresponding to the radio nodes 710, 810, 820. The couplings manager 1140 may be structured to manage interference coupling information of the cells 715, 815, 825 including interference couplings between the cells 715, 815, 825. The load manager 1150 may be structured to manage the load in the network 700, 800 including determination and allocation of available headroom. The scheduler 1110 may be structured to control an overall operation of the central scheduler 910 including any coordination activities with other nodes 710, 730, 810, 820, 830 in the network 700, 800. Examples of operations that may be performed by these devices will be described in conjunction with FIG. 13.

Figure 12:
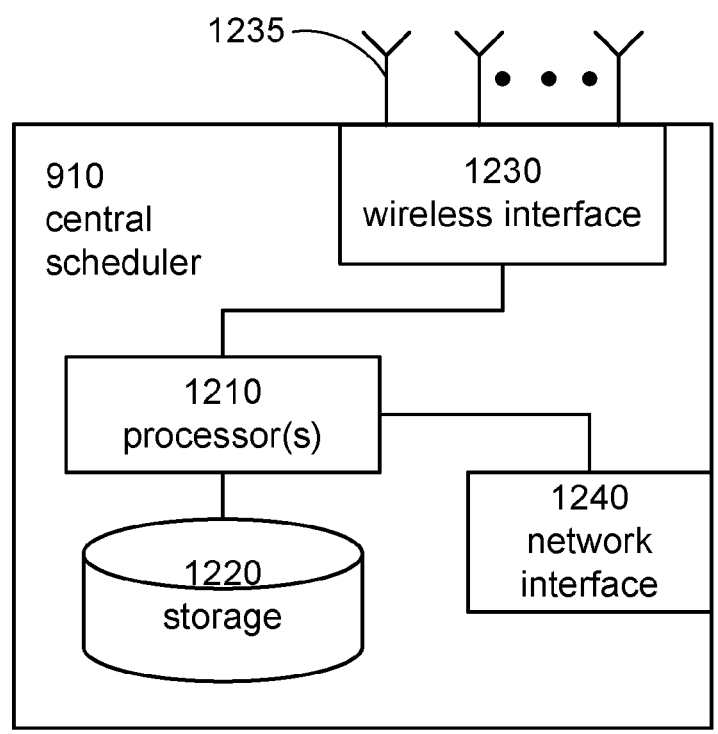

FIG. 11 provides a logical view of the central scheduler 910 and the devices included therein. It is not strictly necessary that each device be implemented as physically separate modules or circuits. Some or all devices may be combined in a physical module. Also, one or more devices may be implemented in multiple physical modules as illustrated in FIG. 12.

The devices of the central scheduler 910 need not be implemented strictly in hardware. It is envisioned that any of the devices maybe implemented through a combination of hardware and software. For example, as illustrated in FIG. 12, the central scheduler 910 may include one or more processors 1210 structured to execute program instructions stored in a non-transitory storage medium or in firmware (e.g., ROM, RAM, Flash) (denoted as storage 1220) to perform the operations of the network node devices. The program instructions may also be received in a transitory manner, e.g., through externally provided signals. The wireless interface 1230 (e.g., a transceiver) may be structured to wirelessly communicate with other network nodes 710, 730, 810, 820, 830 over one or more antennas 1235. For example, microwave may be used for communication among the nodes of the network (see bidirectional arrows in FIGS. 7 and 8). The wireless interface 1230 may also be structured to communicate with users 740, 840. The central scheduler 910 may also use a network interface 1240, which may be a wired interface, to communicate with other network nodes 710, 730, 810, 820, 830.

Figure 13:
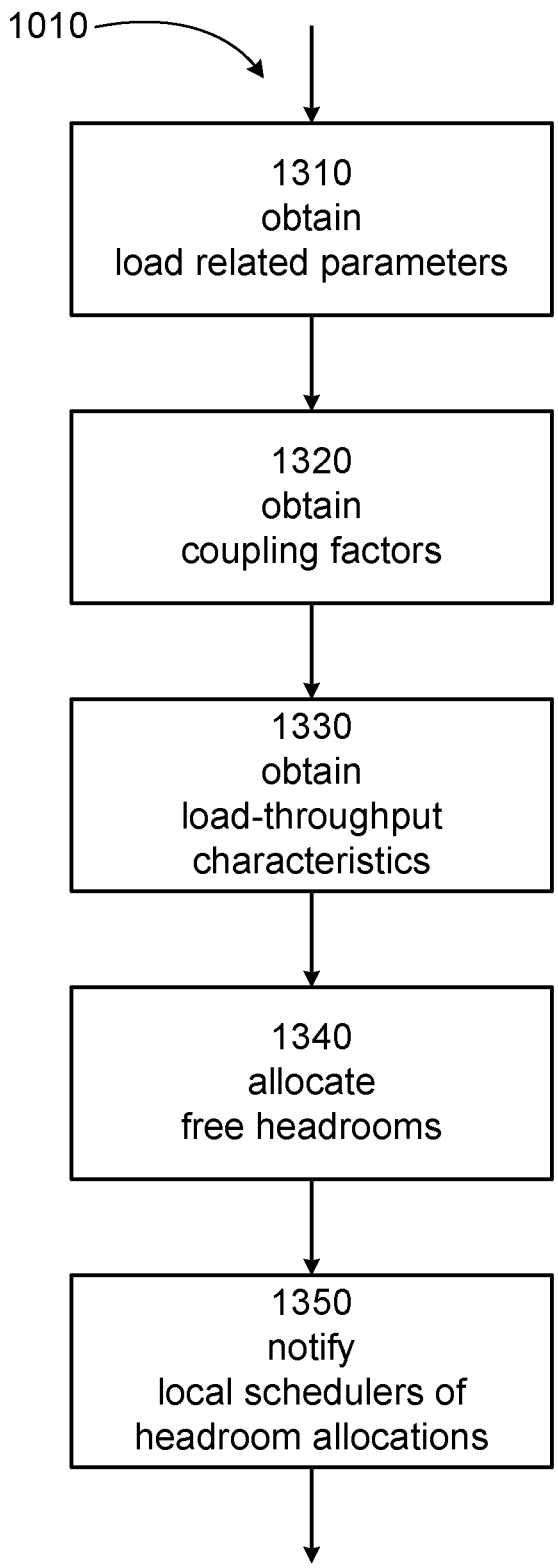
FIG. 13 illustrates a flow chart of an example process performed by a central scheduler in semi-decentralized scheduling.

FIG. 13 illustrates a flow chart of an example process performed by the central scheduler 910 in semi-decentralized scheduling to implement step 1010 of FIG. 10, i.e., to centrally allocate the available load to each of the plurality of local schedulers 920. In step 1310, the parameters manager 1130 may obtain load related parameters of each of the plurality of cells 715, 815, 825. The load related parameters for each cell j 715, 815, 825 may include, among others, any one or more of a number of users $n_j$, a minimum required load $\Sigma_{i=1}^{n_j} L_{ji}$, a throughput proportionality $\hat{k}_j$, and a throughput distribution $\Sigma_{i=1}^{n_j} r_{ji}$.

FIG. 14 illustrates a flow chart of an example process performed the central scheduler 910 to implement step 1310. In step 1410, the parameters manager 1130 may receive the throughput distribution $\Sigma_{i=1}^{n_j} r_{ji}$ of each cell j 715, 815, 825 from the associated local scheduler 920. In step 1420, the parameters manager 1130 may receive the throughput proportionality $\hat{k}_j$ of each cell j 715, 815, 825 from the associated local scheduler 920. One or both of the throughput distribution $\Sigma_{i=1}^{n_j} r_{ji}$ and the throughput proportionality $\hat{k}_j$ may be received via the communicator 1120. In step 1430, the parameters manager 1130 may determine the minimum required load $\Sigma_{i=1}^{n_j} L_{jil}$ of each cell j 715, 815, 825.

FIG. 15 illustrates a flow chart of an example process performed the parameters manager 1130 to implement step 1430. As seen, for each cell j 715, 815, 825 in the network 700, 800, the parameters manager 1130 may receive either a number of users $n_j$ in step 1510 or receive the minimum required load $\Sigma_{i=1}^{n_j} L_{jil}$ in step 1530 from the associated local scheduler 920. Again, these may be received via the communicator 1120. In step 1520, for each cell j 715, 815, 825 for which the number of users $n_j$ is received, parameters manager 1130 may calculate the minimum required load $\Sigma_{i=1}^{n_j} L_{jil} = n_j L_p$, in which $L_p$ represents a load of a reference channel. An example of a reference channel is a control channel such as DPCCH.

Referring back to FIG. 13, in step 1320, the couplings manager 1140 of the central scheduler 910 may obtain coupling factors $u_{xy}$ of each pair of cells x and y of the plurality of cells 715, 815, 825. Recall these are the quantities (a) described above. In one embodiment, the coupling factors $u_{xy}$ may be accessible to the central scheduler 910, such as in a database or storage. Note that a non-zero coupling factor $u_{xy}$ implies that the cells x and y are relatively close to each other, or may even overlap. That is, the network 700, 800 may be such that each cell 715, 815, 825 partially or wholly overlaps with at least one other cell 715, 815, 825, e.g., such as in HetNet, and/or is geographically adjacent to at least one other cell 715, 815, 825.

In step 1330, the load manager 1150 may obtain the load-throughput characteristics of each cell 715, 815, 825 of the network 700, 800. It should be noted this step is an option. For the proposed semi-decentralized scheduling scheme to work properly, the central scheduler 910 should have sufficient knowledge about the scheduling algorithm employed for each local scheduler 920. The most straight forward way to achieve this is for the central scheduler 910 and the local schedulers 920 to agree to use the same local scheduling algorithm. For example, they may agree to use the WTWF algorithm. In this way, the central scheduler 910 would have exact knowledge of the algorithm utilized at the local schedulers 920, and thus would enable the central scheduler 910 to allocate the available headroom in an optimal way. This also minimizes communication required between the central and local schedulers 910, 920 since the information regarding scheduling algorithms need not be exchanged. If the straight forward way is implemented, then the step 1330 may be skipped altogether.

Figure 16:
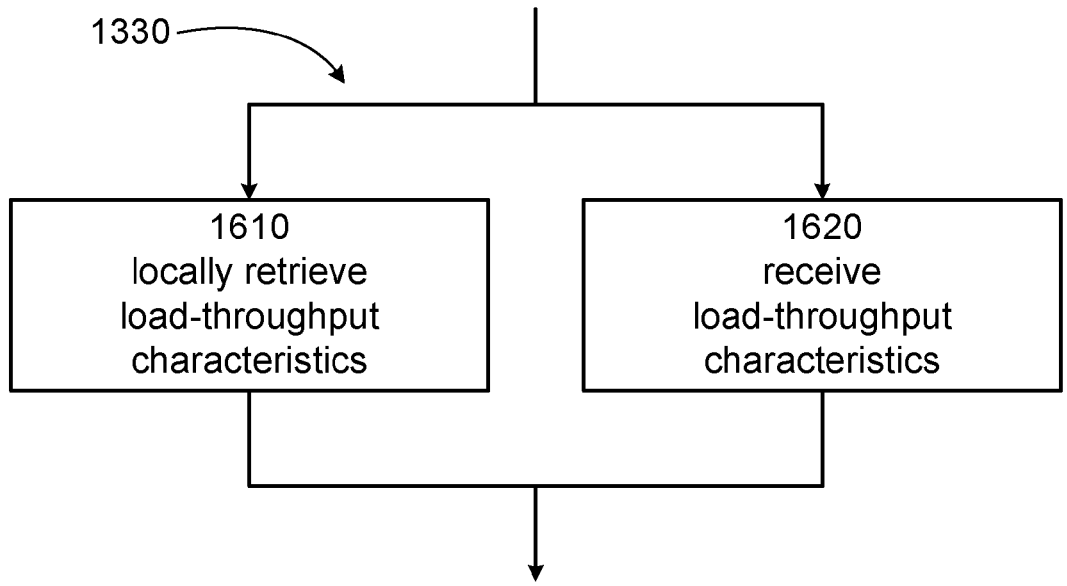
FIG. 16 illustrates a flow chart of an example process performed by a central scheduler to obtain load-throughput characteristics of cells.

Alternatively, FIG. 16 illustrates a flow chart of an example process performed by the load manager 1150 to implement step 1330. Recall that in the proposed semi-decentralized scheduling scheme, the issue of scheduling radio resources is reformulated load scheduling issue. This implies that the central scheduler 910 should know about the load-throughput characteristics of the scheduling algorithms of the local scheduler 920. For example, based on the load-throughput characteristics, the central scheduler 910 may determine an expected throughput when the local scheduler 920 is allocated a certain amount of load headroom. This knowledge still enables the central scheduler 910 to optimize the headroom allocation. The load-throughput characteristics for some or all local schedulers 920 may be locally available to the central scheduler 910, e.g., in local storage or data base. For these local schedulers 920, the load manager 1150 may locally retrieve the load-throughput characteristics in step 1610.

In some instances, the load manager 1150 may receive the load-throughput characteristics from the local schedulers 920, e.g., via the communicator 1120, in step 1620. Note that detailed knowledge of the scheduling algorithm is not necessary. For example, a numerical value relating the load and expected throughput may suffice. This helps to minimize the communication requirements between the central and local schedulers 910, 920.

Referring back to FIG. 13, in step 1340, the load manager 1150 may allocate a free headroom $L_{Fj}$ to that each cell j 715, 815, 825 of the network 700, 800 based on the load related parameters of the cells 715, 815, 825 and the coupling factors $u_{xy}$ among the cells 715, 815, 825. In step 1350, load manager 1150 may notify each local scheduler 920 of the free headroom $L_{Fj}$ allocated to the associated cell 715, 815, 825. As mentioned on multiple occasions above, wherein free headroom $L_{Fj}$ corresponding to each cell 715, 815, 825 may be said to define an amount of load headroom available for distribution among the users 740, 840 of that cell 715, 815, 825 when the local scheduler 920 associated with that cell 715, 815, 825 schedules the radio resources to those users 740, 840.

Figure 17:
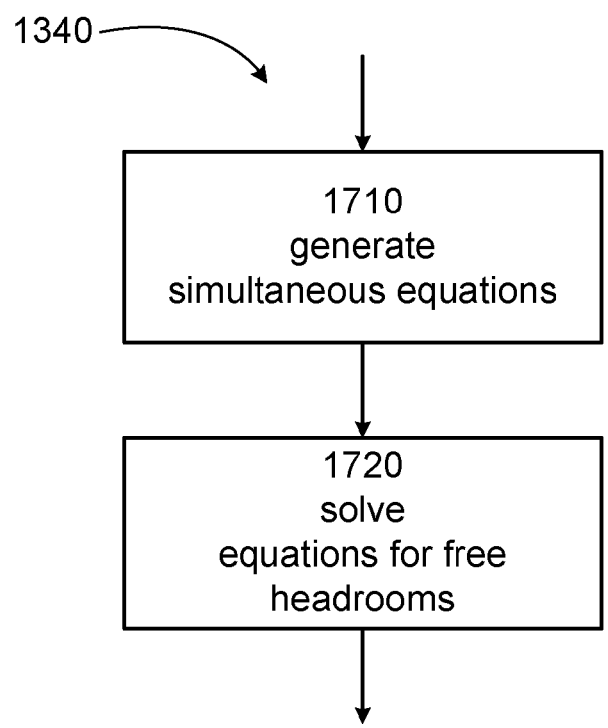
FIG. 17 illustrates a flow chart of an example process performed by a central scheduler to allocate free headrooms to cells of a network.

FIG. 17 illustrates a flow chart of an example process performed by the load manager 1150 to implement step 1340. In step 1710, the load manager 1150 may generate a set of simultaneous equations. Each equation may model a total received power $I_{tot}^x$ at the radio node 710, 810, 820 of a particular cell x. The modeling may take form of any of the equations (32), (33) and (34) described above. From these equations, it can be seen that the total received power $I_{tot}^x$ may be modeled as a combination of an own contribution, a coupled interference contribution, and other contribution (e.g., $I_{other}^A + N_0^A$ in (32) and (33)). The own contribution may be the contribution to the total received power $I_{tot}^x$, due to transmissions from the users 740, 840 of the cell x (e.g., $\Sigma_{i=n_A+1} \phi_{Ai}$ of (32) or $L_A I_{tot}^A$ of (33)). The coupling interference contribution may comprise, for each cell y different from the cell x, contribution of that different cell y coupled to the cell x by the coupling factor $u_{xy}$ (e.g., $\Sigma_{i=n_A+1} u_{Ai} \phi_{Bi}$ of (32) or $u_{AB} L_B I_{tot}^B$ of (33)). In step 1720, the load manager 1150 may solve the set of simultaneous equations for the free headrooms $L_{Fj}$ to be allocated to each of the plurality of cells 715, 815, 825.

In one aspect, to generate the simultaneous equations in step 1710, the load manager 1150 may generate a matrix in the form of $AD_L$. Then in step 1720, the load manager 1150 may solve the matrix $AD_L$ for the free headroom matrix $$L_F = \begin{bmatrix} L_{F1} \\ L_{F2} \\ \vdots \\ L_{Fc} \end{bmatrix}$$

(see also equation (44)) to satisfy the stability condition $\rho(AD_L) < 1$ in equation (37). In step 1720, the load manager 1150 may further solve the matrix $AD_L$ for the free headroom matrix so as to maximize throughput $$\Gamma_{TOT} = \sum_{j=1}^{c} \hat{k}_j L_{Fj}$$

as expressed in equation (40). In this instance, the matrix $AD_L$ may be solved subject to the condition $$\frac{\hat{k}_{j_0} L_{Fj_0}}{\hat{k}_{j_1} L_{Fj_1}} = \frac{\hat{\Theta}_{j_0}}{\hat{\Theta}_{j_1}}$$

expressed in equation (42). In a particular implementation, the matrix $AD_L$ may be solved such that $$L_F = \begin{bmatrix} L_{F1} \\ L_{F2} \\ \vdots \\ L_{Fc} \end{bmatrix} = a \begin{bmatrix} \hat{\Theta}_1/\hat{k}_1 \\ \hat{\Theta}_2/\hat{k}_2 \\ \vdots \\ \hat{\Theta}_c/\hat{k}_c \end{bmatrix}$$

as expressed in equation (44) in which the scalar a is chosen according to $\rho(AD_L) = L_{stab}$ expressed in equation (45).

Figure 18:
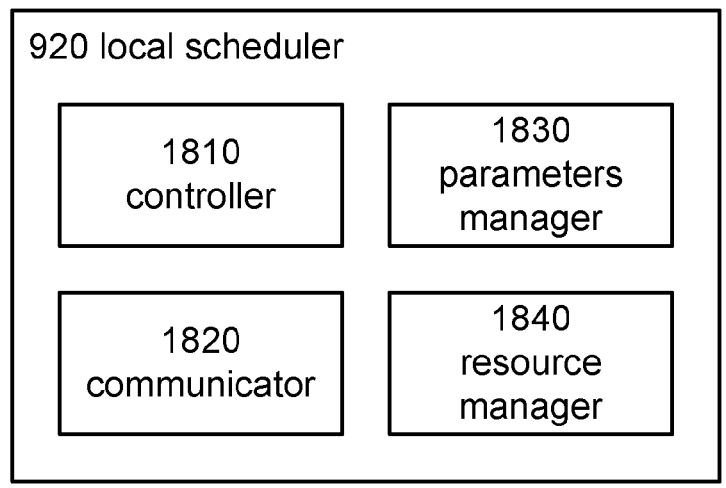
FIGS. 18 and 19 illustrate embodiments of a central scheduler structured to perform semi-decentralized scheduling.

FIG. 18 illustrates an embodiment of the local scheduler 920 structured to schedule radio resources to users 740, 840 located in a cell 715, 815, 825 of a wireless network 700, 800 associated with the local scheduler 920. As seen, the example local scheduler 920 may include a controller 1810, a communicator 1820, a parameters manager 1830 and a resource manager 1840. The communicator 1820 may be structured to communicate with one or more radio nodes 710, 810, 820 of the network 700, 800, and with a central scheduler 910. The parameters manager 1830 may be structured to manage load related parameters of the corresponding cell 715, 815, 825. The resource manager 1140 may be structured to schedule radio resources to users 740, 840 located in the corresponding cell 715, 815, 825. The controller 1810 may be structured to control an overall operation of the local scheduler 920. Examples of operations that may be performed by these devices will be described in conjunction with FIG. 20.

Figure 19:
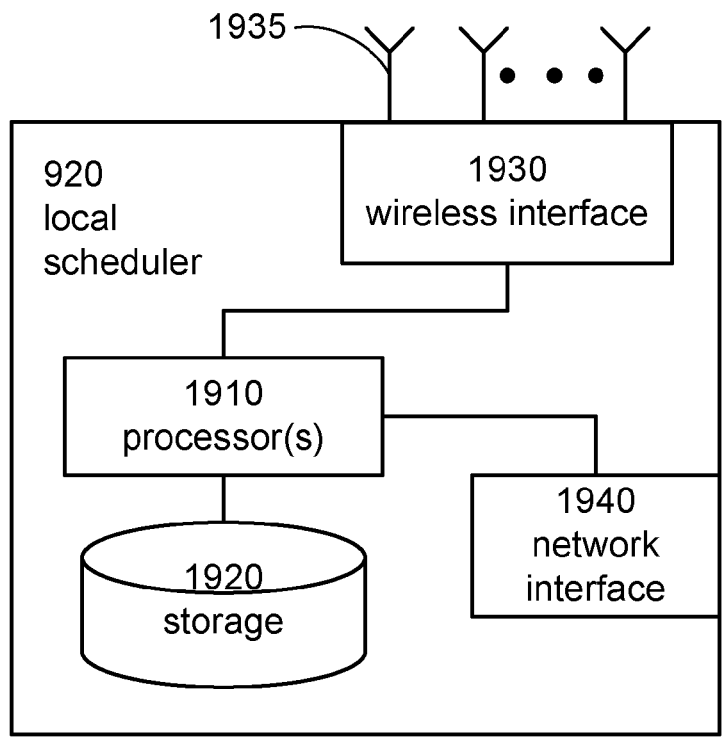

FIG. 18 provides a logical view of the local scheduler 920 and the devices included therein. It is not strictly necessary that each device be implemented as physically separate modules or circuits. Some or all devices may be combined in a physical module. Also, one or more devices may be implemented in multiple physical modules as illustrated in FIG. 19.

The devices of the local scheduler 920 need not be implemented strictly in hardware. It is envisioned that any of the devices maybe implemented through a combination of hardware and software. For example, as illustrated in FIG. 19, the local scheduler 920 may include one or more processors 1910 structured to execute program instructions stored in a non-transitory storage medium or in firmware (e.g., ROM, RAM, Flash) (denoted as storage 1920) to perform the operations of the network node devices. The program instructions may also be received in a transitory manner, e.g., through externally provided signals. The wireless interface 1930 (e.g., a transceiver) may be structured to wirelessly communicate with other network nodes 710, 730, 810, 820, 830 over one or more antennas 1935. For example, microwave may be used for communication among the nodes of the network (see bidirectional arrows in FIGS. 7 and 8). The wireless interface 1930 may also be structured to communicate with users 740, 840. The local scheduler 920 may also use a network interface 1940, which may be a wired interface, to communicate with other network nodes 710, 730, 810, 820, 830.

Figure 20:
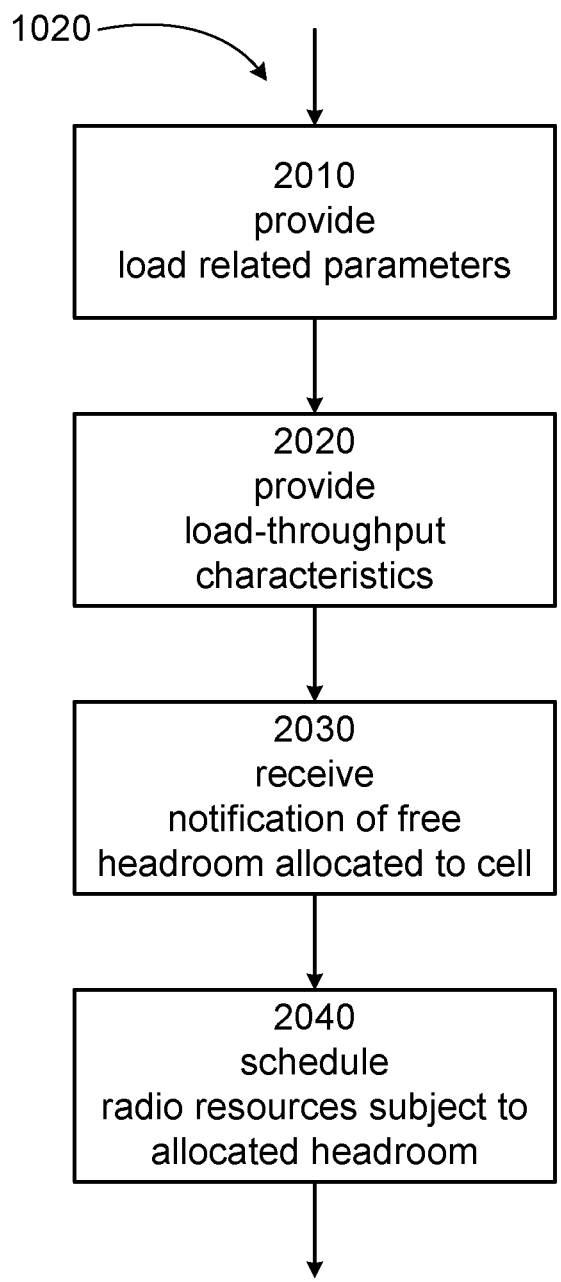
FIG. 20 illustrates a flow chart of an example process performed by a local scheduler in semi-decentralized scheduling.

FIG. 20 illustrates a flow chart of an example process performed by the local scheduler 920 in semi-decentralized scheduling to implement step 1020 of FIG. 10, i.e., to locally grant radio resources to users 740, 840 located in the cell 715, 815, 825 associated with the local scheduler 920. In step 2010, the parameters manager 1830 may provide load related parameters of the associated cell 715, 815, 825 to the central scheduler 920 via the communicator 1820. The load related parameters of the cell 715, 815, 825 may include, among others, any one or more of a number of users $n_j$, a minimum required load $\Sigma_{i=1}^{n_j} L_{il}$, a throughput proportionality $\hat{k}_j$, and a throughput distribution $\Sigma_{i=1}^{n_j} r_{ji}$ via the communicator 1820. Note that if one of the number of users $n_j$ and the minimum required load $\Sigma_{i=1}^{n_j} L_{il}$ is provided, the other need not be provided. Of course, both may be provided.

In step 2020, the resource manager 1840 may provide the load-throughput characteristics of the scheduler 1840 to the central scheduler 920 via the communicator 1820. This may be optional in that the central scheduler 920 may already have this information. When provided, the load-throughput characteristics enables the central scheduler 910 to determine an expected throughput when the local scheduler 920 is allocated a certain amount of load headroom. An example of the load-throughput characteristic is a numerical value that relates the load and expected throughput.

In step 2030, the resource manager 1840 may be notified of the free headroom $L_{Fj}$ allocated to the associated cell 715, 815, 825. Then in step 2040, the resource manager 1840 may schedule radio resources to the users located in the associated cell 715, 815, 825 subject to the allocated free headroom. When each local scheduler 920 adheres to its allocated free headroom, the system as a whole should be stable.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a central scheduler to schedule radio resources to users located in a plurality of cells of a wireless network, the method comprising:
   for each cell, obtaining load related parameters of that cell;
   for each cell pair among the plurality of cells, obtaining a coupling factor of that cell pair;
   for each cell, allocating a free headroom $L_{Fj}$ to that cell based on the load related parameters of the cells and based on the coupling factors among the cells; and
   for each cell, notifying a local scheduler associated with that cell of the free headroom $L_{Fj}$ allocated to that cell;
   wherein each cell:
   a) partially or wholly overlaps with at least one other cell, or
   b) is geographically adjacent to at least one other cell, or c) partially or wholly overlaps with at least one other cell and is geographically adjacent to the at least one other cell, wherein for each cell, the load related parameters of that cell comprise a minimum required load $\Sigma_{i=1}^{n_j} L_{jil}$, a throughput distribution $\Sigma_{i=1}^{n_j} r_{ji}$, and a throughput proportionality $\hat{k}_j$ of that cell, wherein each cell pair comprises a cell x and a cell y, and the corresponding coupling factor $u_{xy}$ couples an interference experienced at the cell x due to usage of the radio resources scheduled for the users of the cell y, wherein for each cell, the corresponding free headroom $L_{Fj}$ defines an amount of load headroom available for distribution among the users of that cell when the local scheduler associated with that cell schedules the radio resources to those users, and wherein the free headrooms $L_{Fj}$ are allocated subject to a system stability of the wireless network, the system stability being defined such that when the radio resources are scheduled to the users in accordance with the allocated headrooms $L_{Fj}$, then for each cell, an interference experienced at that cell due to usage of the scheduled radio resources does not exceed a maximum allowable interference at that cell.

2. The method of claim 1, wherein the step of obtaining the load related parameters for each cell comprises:
for each cell, receiving the throughput distribution $\Sigma_{i=1}^{n_j} r_{ji}$ of that cell from the local scheduler associated with that cell;
for each cell, receiving the throughput proportionality $\hat{k}_j$ of that cell from the local scheduler associated with that cell; and
for each cell, determining the minimum required load $\Sigma_{i=1}^{n_j} L_{jil}$ of that cell.

3. The method of claim 1, wherein the step of allocating the free headrooms $L_{Fj}$ to the plurality of cells comprises:
generating a set of simultaneous equations, each equation modeling a total received power $I_{tot}^x$ at a radio node of each cell x; and
solving the set of simultaneous equations for the free headrooms $L_{Fj}$ to be allocated to the plurality of cells,
wherein for each cell, the total received power $I_{tot}^x$ at the radio node of that cell is modeled as a combination of an own contribution, a coupled interference contribution, and an other contribution,
wherein the own contribution of the cell x comprises contribution to the total received power $I_{tot}^x$ due to transmissions from the users of the cell x, and
wherein the coupled interference contribution to the cell x comprises, for each cell y different from the cell x, an own contribution of that different cell y coupled to the cell x by the coupling factor $u_{xy}$.

4. The method of claim 3,
wherein the step of generating the set of simultaneous equations comprises generating a matrix in a form of $AD_L$ in which $$A = \begin{bmatrix} 1 & u_{12} & \cdots & u_{1c} \\ u_{21} & 1 & \cdots & u_{2c} \\ \vdots & \vdots & \ddots & \vdots \\ u_{c1} & u_{c2} & \cdots & 1 \end{bmatrix}$$

is a coupling matrix, each $u_{xy}$ is the coupling factor that couples interferences in cell x to users in cell y, c is the number of cells, $D_L = \text{diag}(L)$, $L = [L_{HR1}, L_{HR2}, \ldots, L_{HRc}]^T$, and each $L_{HRy}$ is the total load of the cell y, and wherein the step of solving the set of simultaneous equations comprises solving the matrix $AD_L$ for a free headroom matrix $$L_F = \begin{bmatrix} L_{F1} \\ L_{F2} \\ \vdots \\ L_{Fc} \end{bmatrix}$$

so as to satisfy a stability condition $\rho(AD_L) < 1$ in which each $L_{FJ}$ denotes the free headroom allocated to each cell, and $\rho(\bullet)$ denotes a spectral radius of the matrix.

5. The method of claim 4, wherein the step of solving the set of simultaneous equations further comprises solving the matrix $AD_L$ for the free headroom matrix $$L_F = \begin{bmatrix} L_{F1} \\ L_{F2} \\ \vdots \\ L_{Fc} \end{bmatrix}$$

so as to maximize a total throughput $$\Gamma_{TOT} = \sum_{j=1}^{c} \hat{k}_j L_{Fj}$$

of the plurality of the cells subject to a condition $$\frac{\hat{k}_{j_0} L_{Fj_0}}{\hat{k}_{j_1} L_{Fj_1}} = \frac{\hat{\Theta}_{j_0}}{\hat{\Theta}_{j_1}}$$

in which $\hat{k}_j L_{Fj}$ and $\hat{\Theta}_j$ respectively represent a throughput upper bound and a throughput fraction of cell j.

6. The method of claim 5, wherein the step of solving the set of simultaneous equations further comprises solving the matrix $AD_L$ such that $$L_F = \begin{bmatrix} L_{F1} \\ L_{F2} \\ \vdots \\ L_{Fc} \end{bmatrix} = a \begin{bmatrix} \hat{\Theta}_1 / \hat{k}_1 \\ \hat{\Theta}_2 / \hat{k}_2 \\ \vdots \\ \hat{\Theta}_c / \hat{k}_c \end{bmatrix},$$

wherein scalar a is chosen such that $\rho(AD\,L) = L_{stab}$ in which $1 - L_{stab} > 0$ represents a stability margin.

7. The method of claim 1, further comprising:
for each cell, obtaining a load-throughput characteristic of the local scheduler associated with that cell, the load-throughput characteristic relating the throughput with the load of a scheduling algorithm used by the associated local scheduler,
wherein the step of allocating the free headrooms $L_{Fj}$ to the plurality of cells comprises, for each cell, allocating the free headrooms $L_{Fj}$ also based on the load-throughput characteristic of the local scheduler associated with that cell.

8. The method of claim 1, wherein the free headrooms $L_{Fj}$ are allocated for uplink scheduling of the radio resources by the local schedulers associated with the plurality of cells.

9. The method of claim 1, wherein the plurality of cells comprises a macro cell and one or more pico cells, each pico cell being wholly or partially overlapped by the macro cell.

10. A central scheduler structured to schedule radio resources to users located in a plurality of cells of a wireless network, the central scheduler included in a node of the wireless network, the central scheduler comprising:

a processor coupled to a memory that stores program instructions, wherein when the processor executes the program instructions, the central scheduler causes the node of the wireless network to:

obtain, for each cell, load related parameters of that cell;

obtain, for each cell pair among the plurality of cells, a coupling factor of that cell pair; and allocate, for each cell, a free headroom $L_{Fj}$ to that cell based on the load related parameters of the cells and based on the coupling factors among the cells, and notify a local scheduler associated with that cell of the free headroom $L_{Fj}$ allocated to that cell, wherein each cell:
a partially or wholly overlaps with at least one other cell, or
b) is geographically adjacent to at least one other cell, or
c) partially or wholly overlaps with at least one other cell and is geographically adjacent to the at least one other cell, wherein for each cell, the load related parameters of that cell comprise a minimum required load $\Sigma_{i=1}^{n_j} L_{jil}$, a throughput distribution $\Sigma_{i=1}^{n_j} r_{ji}$, and a throughput proportionality $\hat{k}_j$ of that cell, wherein each cell pair comprises a cell x and a cell y, and the corresponding coupling factor $u_{xy}$ couples an interference experienced at the cell x due to usage of the radio resources scheduled for the users of the cell y, wherein for each cell, the corresponding free headroom $L_{Fj}$ defines an amount of load headroom available for distribution among the users of that cell when the local scheduler associated with that cell schedules the radio resources to those users, and wherein the free headrooms $L_{Fj}$ are allocated subject to a system stability of the wireless network, the system stability being defined such that when the radio resources are scheduled to the users in accordance with the allocated headrooms $L_{Fj}$, then for each cell, an interference experienced at that cell due to usage of the scheduled radio resources does not exceed a maximum allowable interference at that cell.

11. The central scheduler of claim 10, wherein in obtaining the load related parameters for each cell, the central scheduler causes the node of the wireless network to:

receive, for each cell, the throughput distribution $\Sigma_{i=1}^{n_j} r_{ji}$ of that cell from the local scheduler associated with that cell, receive, for each cell, the throughput proportionality $\hat{k}_j$ of that cell from the local scheduler associated with that cell, and determine, for each cell, the minimum required load $\Sigma_{i=1}^{n_j} L_{jil}$ of that cell.

12. The central scheduler of claim 10, wherein in allocating the free headrooms $L_{Fj}$ to the plurality of cells, the central scheduler causes the node of the wireless network to:

generate a set of simultaneous equations, each equation modeling a total received power $I_{tot}^y$ at a radio node of each cell y, and solve the set of simultaneous equations for the free headrooms $L_{Fj}$ to be allocated to the plurality of cells, wherein for each cell, the total received power $I_{tot}^y$ at the radio node of that cell is modeled as a combination of an own contribution, a coupled interference contribution, and an other contribution, wherein the own contribution of the cell y comprises contribution to the total received power $I_{tot}^y$ due to transmissions from the users of the cell y, and wherein the coupled interference contribution of the cell y comprises, for each cell x different from the cell y, own contribution of that different cell x coupled to the cell y by the coupling factor $u_{xy}$.

13. The central scheduler of claim 12, wherein in generating the set of simultaneous equations, the central scheduler causes the node of the wireless network to generate a matrix equation in a form of $AD_L$ in which $$A = \begin{bmatrix} 1 & u_{12} & \ldots & u_{1c} \\ u_{21} & 1 & \ldots & u_{2c} \\ \vdots & \vdots & \ddots & \vdots \\ u_{c1} & u_{c2} & \ldots & 1 \end{bmatrix}$$

is a coupling matrix, each $u_{xy}$ is the coupling factor that couples users in cell y to interferences in cell x, c is the number of cells, $D_L = \text{diag}(L)$, $L = [L_1, L_2, \ldots, L_c]^T$, and each $L_x$ is the total load of the cell x, and wherein in solving the set of simultaneous equations, the central scheduler causes the node of the wireless network to solve the matrix equation $AD_L$ for a free headroom matrix $$L_F = \begin{bmatrix} L_{F1} \\ L_{F2} \\ \vdots \\ L_{Fc} \end{bmatrix}$$

so as to satisfy a stability condition $\rho(AD\ L) < 1$ in which each $L_{fj}$ denotes the free headroom allocated to each cell, and $\rho(\cdot)$ denotes a spectral radius of the matrix.

14. The central scheduler of claim 13, wherein in solving the set of simultaneous equations, the central scheduler causes the node of the wireless network to solve the matrix equation $AD_L$ for the free headroom matrix $$L_F = \begin{bmatrix} L_{F1} \\ L_{F2} \\ \vdots \\ L_{Fc} \end{bmatrix}$$

so as to maximize a total throughput of the $$\Gamma_{TOT} = \sum_{j=1}^{c} \hat{k}_j L_{Fj}$$

of the plurality of the cells subject to a condition $$\frac{\hat{k}_{j_0} L_{Fj_0}}{\hat{k}_{j_1} L_{Fj_1}} = \frac{\hat{\Theta}_{j_0}}{\hat{\Theta}_{j_1}}$$

in which $\hat{k}_j L_{Fj}$ and $\hat{\Theta}_j$ respectively represent a throughput upper bound and a throughput fraction of cell j.

15. The central scheduler of claim 14, wherein in solving the set of simultaneous equations, the central scheduler causes the node of the wireless network to solve the matrix equation $AD_L$ such that $$L_F = \begin{bmatrix} L_{F1} \\ L_{F2} \\ \vdots \\ L_{Fc} \end{bmatrix} = a \begin{bmatrix} \hat{\Theta}_1/\hat{k}_1 \\ \hat{\Theta}_2/\hat{k}_2 \\ \vdots \\ \hat{\Theta}_c/\hat{k}_c \end{bmatrix},$$

wherein scalar a is chosen such that $\rho(AD\ L) = L_{stab}$ in which $1 - L_{stab} > 0$ represents a stability margin.

16. The central scheduler of claim 10, wherein in allocating the free headrooms $L_{Fj}$ to the plurality of cells, the central scheduler causes the node of the wireless network to allocate, for each cell, the free headrooms $L_{Fj}$ also based on a load-throughput characteristic of the local scheduler associated with that cell, the load-throughput characteristic relating the throughput with the load of a scheduling algorithm used by the associated local scheduler.

17. The central scheduler of claim 10, wherein the free headrooms $L_{Fj}$ are allocated for uplink scheduling of the radio resources by the local schedulers associated with the plurality of cells.

18. The central scheduler of claim 10, wherein the plurality of cells comprises a macro cell and one or more pico cells, each pico cell being wholly or partially overlapped by the macro cell.

19. A non-transitory computer-readable medium comprising, stored therein, programming instructions that when executed by a computer of a central scheduler, cause the computer to schedule radio resources to users located in a plurality of cells of a wireless network by:
  for each cell, obtaining load related parameters of that cell;
  for each cell pair among the plurality of cells, obtaining a coupling factor of that cell pair;
  for each cell, allocating a free headroom $L_{Fj}$ to that cell based on the load related parameters of the cells and based on the coupling factors among the cells; and
  for each cell, notifying a local scheduler associated with that cell of the free headroom $L_{Fj}$ allocated to that cell;
  wherein each cell:
    a) partially or wholly overlaps with at least one other cell, or
    b) is geographically adjacent to at least one other cell, or
    c) partially or wholly overlaps with at least one other cell and is geographically adjacent to the at least one other cell,
  wherein for each cell, the load related parameters of that cell comprise a minimum required load $\Sigma_{i=1}^{n_j} L_{jil}$, a throughput distribution $\Sigma_{i=1}^{n_j} r_{ji}$, and a throughput proportionality $\hat{k}_j$ of that cell,
  wherein each cell pair comprises a cell x and a cell y, and the corresponding coupling factor $u_{xy}$ couples an interference experienced at the cell x due to usage of the radio resources scheduled for the users of the cell y,
  wherein for each cell, the corresponding free headroom $L_{Fj}$ defines an amount of load headroom available for distribution among the users of that cell when the local scheduler associated with that cell schedules the radio resources to those users, and
  wherein the free headrooms $L_{Fj}$ are allocated subject to a system stability of the wireless network, the system stability being defined such that when the radio resources are scheduled to the users in accordance with the allocated headrooms $L_{Fj}$, then for each cell, an interference experienced at that cell due to usage of the scheduled radio resources does not exceed a maximum allowable interference at that cell.

20. A method performed at a local scheduler to schedule radio resources to users located in a cell of a wireless network associated with the local scheduler, the method comprising:
  providing load related parameters of the associated cell to a central scheduler of the wireless network;
  receiving from the central scheduler a notification of a free headroom $L_{Fj}$ allocated to the associated cell; and
  scheduling the radio resources to one or more users located in the associated cell subject to the free headroom $L_{Fj}$ allocated to the cell by the central scheduler;
  wherein the associated cell:
    a) partially or wholly overlaps with at least one other cell, or
    b) is geographically adjacent to at least one other cell, or
    c) partially or wholly overlaps with at least one other cell and is geographically adjacent to the at least one other cell,
  wherein the load related parameters of the associated cell provided to the central scheduler comprises a throughput distribution $\Sigma_{i=1}^{n_j} r_{ji}$, a throughput proportionality $\hat{k}_j$, and one or both of a minimum required load $\Sigma_{i=1}^{n_j} L_{jil}$ and a number of users $n_j$ of the associated cell,
  wherein the free headroom $L_{Fj}$ defines an amount of load headroom available for distribution among the users of the associated cell when the local scheduler schedules the radio resources to those users, and
  wherein when the radio resources are scheduled to the users in accordance with the allocated headrooms $L_{Fj}$, then an interference experienced at the associated cell due to usage of the scheduled radio resources does not exceed a maximum allowable interference at the associated cell.

21. The method of claim 20, wherein the allocated free headroom $L_{Fj}$ is used for uplink scheduling of the radio resources.

22. The method of claim 20, wherein the local scheduler is a part of a radio node serving the associated cell.

23. The method of claim 20, wherein the associated cell is a macro cell that overlaps one or more pico cells or is a pico cell overlapped by a macro cell.

24. A local scheduler structured to schedule radio resources to users located in a cell of a wireless network associated with the local scheduler, the local scheduler included in a node serving the cell of the wireless network, the local scheduler comprising:
  a processor coupled to a memory that stores program instructions, wherein when the processor executes the program instructions, the local scheduler causes the node serving the cell of the wireless network to:
provide load related parameters of the associated cell to a central scheduler of the wireless network, and
receive from the central scheduler a notification of a free headroom $L_{Fj}$ allocated to the associated cell, and schedule the radio resources to one or more users located in the associated cell subject to the free headroom $L_{Fj}$ allocated to the cell by the central scheduler,
wherein the associated cell:
  a) partially or wholly overlaps with at least one other cell, or
  b) is geographically adjacent to at least one other cell, or
  c) partially or wholly overlaps with at least one other cell and is geographically adjacent to the at least one other cell,
wherein the load related parameters of the associated cell provided to the central scheduler comprises a throughput distribution $\Sigma_{i=1}^{n_j} r_{ji}$, a throughput proportionality $k_j$, and one or both of a minimum required load and a number of users $n_j$ of the associated cell,
wherein the free headroom $L_{Fj}$ defines an amount of load headroom available for distribution among the users of the associated cell when the local scheduler schedules the radio resources to those users, and
wherein when the radio resources are scheduled to the users in accordance with the allocated headrooms $L_{Fj}$, then an interference experienced at the associated cell due to usage of the scheduled radio resources does not exceed a maximum allowable interference at the associated cell.

25. The local scheduler of claim 24, wherein the allocated free headroom $L_{fj}$ is used for uplink scheduling of the radio resources.

26. The local scheduler of claim 24, wherein the associated cell is a macro cell that overlaps one or more pico cells or is a pico cell overlapped by a macro cell.

27. A non-transitory computer-readable medium, comprising stored therein, programming instructions that when executed by a computer of a local scheduler cause the computer to schedule radio resources to users located in a cell of a wireless network associated with the local scheduler by:
providing load related parameters of the associated cell to a central scheduler of the wireless network;
receiving from the central scheduler a notification of a free headroom $L_{Fj}$ allocated to the associated cell; and
scheduling the radio resources to one or more users located in the associated cell subject to the free headroom $L_{Fj}$ allocated to the cell by the central scheduler;
wherein the associated cell:
  a) partially or wholly overlaps with at least one other cell, or
  b) is geographically adjacent to at least one other cell, or
  c) partially or wholly overlaps with at least one other cell and is geographically adjacent to the at least one other cell,
wherein the load related parameters of the associated cell provided to the central scheduler comprises a throughput distribution $\Sigma_{i=1}^{n_j} r_{ji}$, a throughput proportionality $k_j$, and one or both of a minimum required load $\Sigma_{i=1}^{n_j} L_{jil}$ and a number of users $n_j$ of the associated cell,
wherein the free headroom $L_{Fj}$ defines an amount of load headroom available for distribution among the users of the associated cell when the local scheduler schedules the radio resources to those users, and
wherein when the radio resources are scheduled to the users in accordance with the allocated headrooms $L_{Fj}$ then an interference experienced at the associated cell due to usage of the scheduled radio resources does not exceed a maximum allowable interference at the associated cell.

* * * * *